(12) United States Patent
Merkel et al.

(10) Patent No.: US 9,339,791 B2
(45) Date of Patent: May 17, 2016

(54) LOW THERMAL EXPANSION ALUMINUM TITANATE ZIRCONIUM TIN TITANATE CERAMICS

(71) Applicant: Corning Incorporated, Corning, NY (US)

(72) Inventors: Gregory Albert Merkel, Corning, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 161 days.

(21) Appl. No.: 13/920,493

(22) Filed: Jun. 18, 2013

(65) Prior Publication Data

US 2014/0371062 A1    Dec. 18, 2014

(51) Int. Cl.
| | |
|---|---|
| *B01J 23/14* | (2006.01) |
| *C04B 35/478* | (2006.01) |
| *C04B 38/00* | (2006.01) |
| *C04B 35/64* | (2006.01) |

(52) U.S. Cl.
CPC ............. *B01J 23/14* (2013.01); *C04B 35/478* (2013.01); *C04B 35/64* (2013.01); *C04B 38/0006* (2013.01); *C04B 2235/3206* (2013.01); *C04B 2235/3213* (2013.01); *C04B 2235/3217* (2013.01); *C04B 2235/3232* (2013.01); *C04B 2235/3244* (2013.01); *C04B 2235/3248* (2013.01); *C04B 2235/3293* (2013.01); *C04B 2235/3436* (2013.01); *C04B 2235/5436* (2013.01); *C04B 2235/5445* (2013.01); *C04B 2235/761* (2013.01); *C04B 2235/80* (2013.01); *C04B 2235/9607* (2013.01)

(58) Field of Classification Search
None
See application file for complete search history.

(56) References Cited

U.S. PATENT DOCUMENTS

| | | | | |
|---|---|---|---|---|
| 4,758,542 | A * | 7/1988 | Parker ........................... | 501/134 |
| 7,713,897 | B2 | 5/2010 | Ogunwumi et al. .......... | 501/134 |
| 7,932,201 | B2 | 4/2011 | Ogunwumi et al. .......... | 501/134 |
| 2007/0197369 | A1 | 8/2007 | Marlin et al. ................ | 501/105 |
| 2008/0226545 | A1* | 9/2008 | Bull et al. .................... | 423/700 |
| 2010/0304965 | A1* | 12/2010 | Boek et al. ................... | 502/344 |
| 2011/0152075 | A1 | 6/2011 | Raffy et al. .................. | 502/439 |

FOREIGN PATENT DOCUMENTS

| | | |
|---|---|---|
| CN | 101407416 | 4/2009 |
| KR | 2003090081 | 11/2003 |
| WO | 2009/144261 | 12/2009 |

OTHER PUBLICATIONS

PCT/US2014/042659 "Search Report and Written Opinion" pp. 1-10.
Bayer et al. (1991) "Effect of Ionic Substitution on the Thermal Expansion of $ZrTiO_4$," J. Am. Ceram. Soc., 74 [9]2 205-208.
(Continued)

*Primary Examiner* — Colin W Slifka
(74) *Attorney, Agent, or Firm* — Charles A. Greene

(57) ABSTRACT

Disclosed herein is a ceramic body comprising at least one phase comprising a pseudobrookite-type crystal structure and at least one phase comprising zirconium tin titanate. Also disclosed are porous ceramic honeycomb structures comprising a ceramic body comprising at least one phase comprising a pseudobrookite-type crystal structure and at least one phase comprising zirconium tin titanate and methods of preparing a ceramic body comprising at least one phase comprising a pseudobrookite-type crystal structure and at least one phase comprising zirconium tin titanate.

16 Claims, 8 Drawing Sheets

(56) References Cited

OTHER PUBLICATIONS

Ikawa et al. (1988) "Phase Transformation and Thermal Expansion of Zirconium and Hafnium Titanates and Their Solid Solutions" J. Am, Ceram. Soc. 71 [2] 120-127.

McHale & Roth (1983) "Investigation of the Phase Transition in $ZrTiO_4$ and $ZrTiO_4$-$SnO_2$ Solid Solutions" Comm. Amer. Ceram. Soc., Feb., C-18 to C-20.

Wilson & Glasser (1989) "Solid Solution in the $ZrO_2$-$SnO_2$-$TiO_2$ System" Transactions 88 [3] 69-74.

Kim et al. (2000) "Low Thermal Expansion Behavior and Thermal Durability of Al2TiO5-ZrTiO4 Ceramics" Revista Latinoamericana de Metalurgia y Materiales, [20] 2, 59-67.

Kim & Cao (2002) "Low thermal expansion behavior and thermal durability of $ZrTiO_4$—$Al_2TiO_5$—$Fe_2O_3$ceramics between 750 and 1400°C" Journal of the European Ceramic Society [22] 2627-2632.

Kim et al. (2002) "Low Thermal Expansion Behavior of $ZrTiO_4$—$Al_2TiO_5$ Ceramics Having High Thermal Durability Between 750 and 1400°C" Key Engineering Materials [224-226] 819-824.

Kim et al. (2005) "Negative Thermal Expansion up to 1000°C of $ZrTiO_4$-$Al_2TiO_5$ Ceramics for High-Temperature Applications" Key Engineering Materials [280-283] 1179-1184.

Kim et al. (2007) "Crack healing, reopening and thermal expansion behavior of Al2TiO5 ceramics at high temperature" Journal of the European Ceramic Society [27] 1431-1434.

Kim (2010) "Thermal stability of Al2TiO5 ceramics for new diesel particulate filter applications- a literature review" Journal of Ceramic Processing Research [11], 4, 411-418.

Parker(1990): "$AI_2TiO_5$-$ZrTiO_4$-$ZrO_2$ Composites: A New Family of Low-Thermal-Expansion Ceramics" J. Am. Ceram. Soc. [73] 14, 929-932.

\* cited by examiner

US 9,339,791 B2

LOW THERMAL EXPANSION ALUMINUM TITANATE ZIRCONIUM TIN TITANATE CERAMICS

TECHNICAL FIELD

The present disclosure relates to a ceramic body comprising at least one phase comprising a pseudobrookite-type crystal structure and at least one phase comprising zirconium tin titanate. Also disclosed herein are porous ceramic honeycomb structures comprising a ceramic body comprising at least one phase comprising a pseudobrookite-type crystal structure and at least one phase comprising zirconium tin titanate. Further disclosed herein are methods of preparing a ceramic body comprising the steps of providing a batch composition comprising at least one zirconium source, at least one tin source, at least one titanium source, at least one aluminum source, and at least one magnesium source, and firing the batch composition under conditions suitable to form a ceramic body comprising at least one phase comprising a pseudobrookite-type crystal structure and at least one phase comprising zirconium tin titanate.

BACKGROUND

The after-treatment of exhaust gas from internal combustion engines may require the use of filters and catalysts supported on high-surface area substrates. In the case of diesel engines and some gasoline direct injection engines, a catalyzed filter for the removal of carbon soot particles may be used. The filters and catalyst supports in these applications should be refractory, thermal shock resistant, stable under a range of $pO_2$ conditions, non-reactive with the catalyst system, and should offer minimal resistance to the exhaust gas flow. Porous ceramic flow-through honeycomb substrates and wall-flow honeycomb filters may, for example, be used in these applications.

SUMMARY

An exemplary embodiment of the disclosure provides a ceramic body comprising at least one phase comprising a pseudobrookite-type crystal structure and at least one phase comprising zirconium tin titanate.

An exemplary embodiment of the disclosure also provides a porous ceramic honeycomb structure comprising a ceramic body comprising at least one phase comprising a pseudobrookite-type crystal structure and at least one phase comprising zirconium tin titanate.

An exemplary embodiment of the disclosure also provides a method for preparing a ceramic body, said method comprising the steps of providing a batch composition comprising at least one zirconium source, at least one tin source, at least one titanium source, at least one aluminum source, and at least one magnesium source, and firing the batch composition under conditions suitable to form a ceramic body comprising at least one phase comprising a pseudobrookite-type crystal structure and at least one phase comprising zirconium tin titanate.

Both the foregoing general summary and the following detailed description are exemplary only and are not restrictive of the disclosure. Further features and variations may be provided in addition to those set forth in the description. For instance, the disclosure describes various combinations and subcombinations of the features disclosed in the detailed description. In addition, it will be noted that where steps are disclosed, the steps need not be performed in that order unless explicitly stated.

DESCRIPTION OF EXEMPLARY EMBODIMENTS

Figure 1:
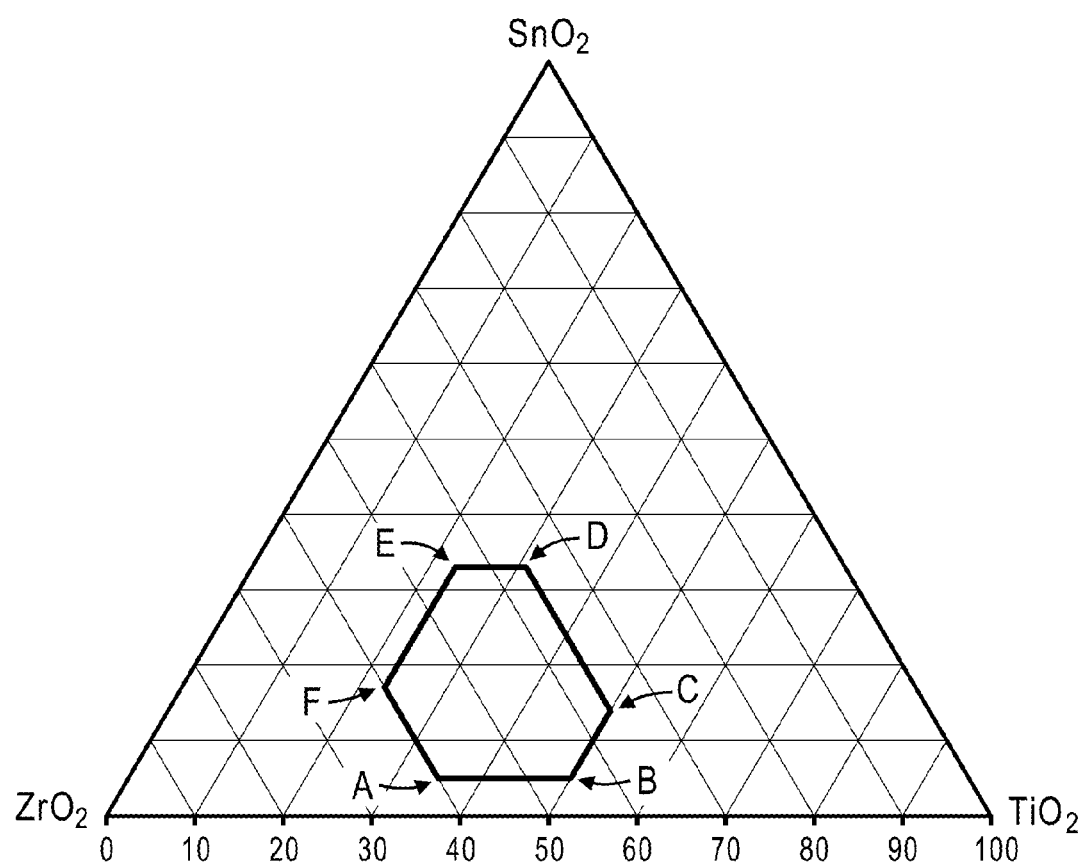
FIG. 1 is a ternary composition diagram in mole percentages of $ZrO_2$, $SnO_2$, and $TiO_2$ components in which the region A-B-C-D-E-F-A encloses compositions of zirconium tin titanate phases coexisting with $Al_2TiO_5$ based pseudobrookite phases in certain embodiments of the ceramic bodies disclosed herein.

Since the introduction of substrates in the 1970s and filters in the 1980s, there has been an increasing trend toward thinner walls in both substrates and filters to reduce pressure drop. Furthermore, there is also a demand for higher porosity substrates to reduce thermal mass to facilitate earlier activation of the catalyst during engine cold starts and higher porosity in filters to further reduce pressure drop and to accommodate larger amounts of catalysts within the filter wall. Thinner walls and higher porosity both may weaken the structure of the honeycomb material; therefore, it is desirable that the inherent flexural strength of the skeletal ceramic material comprising the walls be as high as possible.

Also, in the case of diesel particulate filters (DPFs), a high volumetric heat capacity may be desired in order to minimize the temperatures that may be reached during the periodic in situ combustion of the accumulated soot, a process known as "regeneration." Since higher porosity and thinner walls reduce the mass of the DPF, the solid material comprising the ceramic should have a high heat capacity per unit volume. To address this need, aluminum titanate based DPFs have been introduced.

Some of the new catalysts with improved performance that are available have been found to exhibit undesirable chemical interactions with existing ceramic filters and substrates. For example, potassium-based nitric oxide ($NO_x$) adsorbers may be rapidly deactivated when applied to silicate-containing ceramics, such as cordierite or aluminum titanate+feldspar. Also, the activity of copper-containing chabazite zeolite catalysts has been found to be reduced by even small amounts of sodium that may occur as an impurity in many cordierite and aluminum titanate+feldspar ceramics.

Moreover, certain catalysts may also have detrimental effects on the ceramic support. For example, it has been found that copper may diffuse or leach from a chabazite catalyst and promote decomposition of aluminum titanate into corundum and rutile, with a subsequent loss in thermal shock resistance of the aluminum titanate+feldspar filter. Ceramics comprised of cordierite+mullite+aluminum titanate are being developed to provide a more durable filter in the presence of copper; however, relative to previous aluminum titanate+feldspar filters, these materials may have a lower volumetric heat capacity, lower melting point, and/or require the use of expensive rare earth oxide additions as sintering aids. Furthermore, such ceramics may contain a glassy grain-boundary phase, and it is proposed that reduction or elimination of a grain-boundary silicate phase may be beneficial in reducing diffusion rates of undesirable cations from the ceramic to the catalyst or from the catalyst to the ceramic.

In an effort to respond to the current trends in reduced wall thickness, higher porosity, higher thermal mass for DPF applications, and reduced chemical interaction with new catalyst systems, disclosed herein are novel ceramic materials based upon aluminum titanate+zirconium tin titanate that, in at least certain embodiments, may exhibit superior strength, higher volumetric heat capacity, an absence of a grain boundary silicate phase, and/or that may not require the use of expensive sintering aids.

In at least certain embodiments disclosed herein, the presence of tin in the zirconium tin titanate phase may be beneficial for providing improved strength to the ceramic body at a low coefficient of thermal expansion (CTE) for a given porosity and pore size. Specifically, the presence of tin in the zirconium tin titanate phase of the ceramic bodies disclosed herein that also contain an aluminum titanate pseudobrookite phase may impart a greater flexural strength, at a given % porosity, median pore diameter, and CTE, than ceramics comprised of an aluminum titanate pseudobrookite phase and a tin-absent zirconium titanate phase. Without wishing to be bound by theory, it is believed that this may be the result of the lower CTE of zirconium tin titanate relative to tin-free zirconium titanate, such that the ceramic bodies disclosed herein require less microcracking to achieve a given low CTE.

Moreover, the ceramic bodies disclosed herein may not require the use of sintering additives to achieve the desired properties. For example, in at least certain embodiments, the ceramic bodies disclosed herein may be sintered at temperatures ranging from about 1400-1500° C. without the need for sintering additives, making them highly refractory. In particular, the expensive rare earth oxide sintering additives used in many other aluminum titanate based ceramics may not be required in certain embodiments disclosed herein.

In certain embodiments, the ceramic bodies disclosed herein do not have a grain-boundary silicate phase. The absence of a grain-boundary silicate phase may render the ceramic bodies useful in applications in which an alkali, such as potassium, is present, for example either in ash deposited from exhaust produced by combustion of a biodiesel fuel, or as a $NO_x$-adsorbing catalyst system. The absence of a grain-boundary silicate phase may also inhibit the exchange of other chemical elements between the ceramic body and any applied catalyst, thereby improving the lifetime of both the ceramic body and the catalyst.

In certain embodiments disclosed herein, the at least one phase comprising a pseudobrookite-type crystal structure contains $MgTi_2O_5$. Embodiments disclosed herein wherein the at least one phase comprising a pseudobrookite-type crystal structure is predominantly $Al_2TiO_5$ with at least several mole percent $MgTi_2O_5$ may exhibit excellent high-temperature stability in the presence of copper, making such ceramic bodies useful in applications in which a copper-containing compound, such as a copper-containing chabazite zeolite, is applied to the ceramic body as a catalyst. Such embodiments may have greater copper durability than magnesium-free aluminum titanate based ceramics.

Zirconium titanate based compounds possess a volumetric heat capacity (4.30 J cm$^{-3}$ K$^{-1}$ at 800K) that is higher than that of aluminum titanate (3.97 J cm$^{-3}$ K$^{-1}$ at 800K), mullite (3.67 J cm$^{-3}$ K$^{-1}$ at 800K), feldspar (2.99 J cm$^{-3}$ K$^{-1}$ at 800K), and cordierite (2.78 J cm$^{-3}$ K$^{-1}$ at 800K). Therefore, ceramic bodies disclosed herein that comprise at least one phase comprising a pseudobrookite-type crystal structure, wherein that pseudobrookite phase is aluminum rich, and at least one phase comprising zirconium tin titanate, are expected to have a higher volumetric heat capacity than ceramics based upon aluminum titanate with a second phase comprising at least one of mullite, feldspar, and cordierite. A higher volumetric heat capacity may be beneficial for application as a diesel particulate filter, for example, wherein the greater thermal mass of the filter reduces the temperatures experienced by the filter during a severe regeneration (combustion of accumulated carbon soot).

Disclosed herein are ceramic bodies comprising at least one phase comprising a pseudobrookite-type crystal structure and at least one phase comprising zirconium tin titanate. In certain embodiments disclosed herein, the at least one phase comprising zirconium tin titanate has a crystal structure based upon, and isostructural with, the compound $ZrTiO_4$ which, in turn, is based upon the structure of $\alpha$-$PbO_2$. Also disclosed herein are porous ceramic honeycomb structures, for example exhaust particulate filters such as diesel particulate filters, comprising a ceramic body comprising at least one phase comprising a pseudobrookite-type crystal structure and at least one phase comprising zirconium tin titanate. Exemplary porous ceramic honeycomb structures may include wall-flow, partial wall-flow, and flow-through honeycomb structures. In certain other exemplary embodiments, the ceramic body may be non-porous.

Further disclosed herein are methods of preparing a ceramic body comprising the steps of providing a batch composition comprising at least one zirconium source, at least one tin source, at least one titanium source, at least one aluminum source, and at least one magnesium source, and firing the batch composition under conditions suitable to form a ceramic body comprising at least one phase comprising a pseudobrookite-type crystal structure and at least one phase comprising zirconium tin titanate. In certain embodiments, the batch composition may be fired at a temperature of at least about 1400° C., such as at least about 1500° C. In certain embodiments, the batch composition may further comprise at least one pore forming agent. The pore forming agents (pore formers) can include, for example, graphite, starch, nut shells, synthetic organic particles, or even combinations thereof. The starch can include, for example, sago palm starch, green mung bean starch, canna starch, corn starch, rice starch, pea starch, or potato starch. The median particle diameter of the pore forming agent is selected according to the application of the ceramic honeycomb, and is preferably between 1 and 60 microns, and is more preferably between 5 and 40 microns.

Pseudobrookite-type crystal structure describes a phase having a crystal structure that is the same as at least one of the minerals pseudobrookite ($Fe_2TiO_5$), karooite ($MgTi_2O_5$), and tialite ($Al_2TiO_5$), without restriction as to composition. The composition of the phase comprising a pseudobrookite-type crystal structure may in certain embodiments be of the general formula $(M^{2+})_w(M^{3+})_x(M^{4+})_y(M^{5+})_zO_5$, wherein $M^{2+}$ is a divalent cation of an element such as magnesium, cobalt, nickel, and copper; $M^{3+}$ is a trivalent cation of an element such as aluminum, iron, gallium, scandium, and titanium; $M^{4+}$ is a tetravalent cation of an element such as titanium, zirconium, tin, silicon, and germanium; $M^{5+}$ is a pentavalent cation of an element such as niobium and tantalum; $(w+x+y+z)=3$; and $2w+3x+4y+5z=10$. It is understood that, as used herein, all instances of w, x, y and z are expressed as molar quantities.

In certain embodiments, the pseudobrookite-type phase is of the composition $(Mg)_{w1}(Al)_{x1}(Fe)_{x2}(Ti)_{y1}(Zr)_{y2}(Sn)_{y3}O_5$ in which $2(w1)+3(x1+x2)+4(y1+y2+y3)=10$ and wherein $0.0 \leq w1 \leq 0.50$, $0.95 \leq x1 \leq 2.01$, $0.0 \leq x2 \leq 0.05$, $0.70 < y1 \leq 1.5$, $0.0 < y2 \leq 0.10$, and $0.0 < y3 \leq 0.20$. In certain embodiments, $0.0 \leq w1 \leq 0.15$, $1.70 \leq x1 \leq 2.01$, $0.0 \leq x2 \leq 0.01$, $0.83 < y1 \leq 1.09$, $0.01 < y2 \leq 0.05$, and $0.05 < y3 \leq 0.12$. In certain other embodiments disclosed herein, the value of w1 is at least about 0.03, as magnesium has been shown to be beneficial in slowing the rate at which a $Al_2TiO_5$-rich pseudobrookite phase decomposes below about 1280° C., for example in the presence of copper ions, which may be present in certain catalyst systems, such as those comprising a copper-containing chabazite zeolite catalyst, when the ceramic body disclosed herein is used as a substrate or particulate filter in the after-treatment of exhaust from an internal combustion engine. In certain other embodiments, x2<0.001. It is understood that, as used herein, all instances of w1, x1, x2, y1, y2 and y3 are expressed as molar quantities.

The zirconium tin titanate has a crystal structure that may be described as based upon, and isostructural with, the compound $ZrTiO_4$. In certain embodiments, the $ZrTiO_4$ in the $ZrO_2$—$TiO_2$ system may undergo at least one phase transformation associated with cation ordering in the crystal lattice at lower temperatures; the zirconium tin titanate phase disclosed herein is not restricted as to the extent of cation ordering. In certain embodiments, however, the crystal structure of the zirconium tin titanate phase may be similar to that of the high-temperature, cation-disordered form of $ZrTiO_4$.

The composition of the at least one phase comprising zirconium tin titanate may, in certain embodiments, be of the general formula $(M^{3+})_{p1}(Zr)_{q1}(Ti)_{q2}(Sn)_{q3}(Hf)_{q4}(M''^{5+})_r O_{4-s}$ wherein $M^{3+}$ is a trivalent cation of an element such as aluminum, gallium, and iron; $M''^{5+}$ is a pentavalent cation of an element such as tantalum and niobium; $(p1+q1+q2+q3+q4+r)=2$; $q3 \geq 0.05$; and $0 \leq s \leq 0.05$.

In certain other embodiments, the zirconium tin titanate phase is of the composition $(Al)_{p1}(Zr)_{q1}(Ti)_{q2}(Sn)_{q3} O_{4-0.5(p1)}$, wherein $(p1+q1+q2+q3)=2$; $0 < p1 \leq 0.08$; and $q3 \geq 0.05$. It is understood that, as used herein, all instances of p1, q1, q2, q3, q4, r and s are expressed as molar quantities. In other embodiments disclosed herein, the value of q2 is not more than about 1.00, such as about 0.90, about 0.80, about 0.70, and about 0.60. In certain other embodiments disclosed herein, the value of q3 may be at least about 0.10, such as at least about 0.20, at least about 0.30, at least about 0.40, at least about 0.50, and at least about 0.60. In other embodiments, the value of $q1/(q1+q2+q3)$ is between about 0.36 and about 0.60, the value of $q2/(q1+q2+q3)$ is between about 0.23 and about 0.50, and the value of $q3/(q1+q2+q3)$ is between about 0.05 and about 0.33. The compositional region defined by these limits is represented, for example, in FIG. 1 by the polygon A-B-C-D-E-F-A, wherein the proportions of $ZrO_2$, $SnO_2$, and $TiO_2$ are given in mole percentages. In at least certain embodiments, the zirconium tin titanate phase contains at least about 5 mole % $SnO_2$.

The ceramic bodies disclosed herein may, in certain embodiments, have a porosity greater than about 45%, such as, for example, greater than about 50%, greater than about 60%, greater than about 65%, or ranging from about 50% to about 65%. In certain embodiments disclosed herein, the ceramic body has a median pore diameter ranging from about 11 μm to about 15 μm. In other embodiments disclosed herein, the ceramic body has a narrow pore size distribution with values of $(d_{90}-d_{10})/d_{50}$, $(d_{90}-d_{50})/d_{50}$, $(d_{50}-d_{10})/d_{50}$ all less than about 0.30. In other exemplary embodiments disclosed herein, the ceramic body may have a $CTE_{RT-1000°\,C}$ value ranging from about $-15 \times 10^{-7}$ °C.$^{-1}$ to about $+30 \times 10^{-7}$ °C.$^{-1}$, making the ceramic bodies disclosed herein useful as wall-flow and partial wall-flow particulate filters for after-treatment of gasoline or diesel engine exhaust. In certain embodiments, the particle sizes of the raw materials and the amounts and particle sizes of organic pore formers could be adjusted to produce porous ceramic bodies for use as flow-through substrates, such as flow-through catalytic converter substrates.

Certain embodiments disclosed herein may include applications requiring a high thermal shock resistance. For such embodiments, the ceramic body disclosed herein may have a low CTE and a high value of MOR/[(E)(CTE$_{500\text{-}1000°\ C.}$)], where MOR and E (Young's elastic modulus) are measured at room temperature. The elastic modulus may be measured by a sonic resonance method. The quantity MOR/[(E)(CTE$_{500\text{-}1000°\ C.}$)] is proportional to the thermal shock resistance of the ceramic body. Specifically, the value of MOR/[(E)(CTE$_{500\text{-}1000°\ C.}$)] provides an estimate of the temperature difference, $\Delta T$, between the hotter interior and the cooler outer surface of the ceramic body that the body can withstand before fracturing when the temperature of the outer surface of the ceramic body is equal to 500° C. Therefore, high ratios of MOR/E and low values of CTE$_{500\text{-}1000°\ C.}$ may provide for a high thermal shock resistance. For certain embodiments, the value of CTE$_{500\text{-}1000°\ C.}$ for the ceramic bodies disclosed herein may be generally proportional to the value of CTE$_{RT\text{-}1000°\ C.}$. Therefore, a low value of CTE$_{RT\text{-}1000°\ C.}$ may also achieve a high thermal shock resistance. Accordingly, in certain embodiments disclosed herein, the value of CTE$_{RT\text{-}1000°\ C.}$ is less than about $30 \times 10^{-7}$ C.$^{-1}$, less than about $25 \times 10^{-7}$ C.$^{-1}$, less than about $20 \times 10^{-7}$ C.$^{-1}$, less than about $15 \times 10^{-7}$ C.$^{-1}$, or even less than about $10 \times 10^{-7}$ C.$^{-1}$. In certain embodiments, the value of MOR/[(E)(CTE$_{500\text{-}1000°\ C.}$)] is at least about 250° C., at least about 300° C., at least about 400° C., at least about 500° C., at least about 600° C., at least about 800° C., and even at least about 1000° C. A value of MOR/[(E)(CTE$_{500\text{-}1000°\ C.}$)] equal to 400° C., for example, indicates that, when the outer surface of the ceramic body is at 500° C., the interior of the ceramic body may be heated to 900° C. (500° C.+$\Delta T$=500° C.+400° C.) before fracture from thermally induced stresses occurs.

The presence of tin in the zirconium tin titanate phase, which may, in certain exemplary embodiments, be in combination with low amounts of titanium, has been found to be beneficial for enabling improved values of MOR for a given CTE, % porosity, and median pore size. This may be important in certain embodiments in which the porosity is high (such as greater than about 50%), the value of $d_{50}$ is large (such as greater than about 12 μm), and the CTE is low (such as less than about $25 \times 10^{-7}$ C.$^{-1}$), as low CTE may be associated with a high degree of microcracking, and high porosity, large pore size, and high microcracking all tend to reduce strength. Specifically, in certain embodiments disclosed herein, the four-point flexural strength, MOR, of the ceramic, in units of pounds/inch$^2$ (psi), is greater than a value "5" where "5" is defined as in Equation 1 (EQ. 1) below:

$$S = 2140 - 18.1(\%\ \text{porosity}) - 57.2(d_{50}) + 6.1(CTE_{RT\text{-}1000°\ C.}) \quad \text{EQ. 1:}$$

wherein $d_{50}$ is the median pore diameter of the ceramic body in units of micrometers and % porosity is the volume percentage of porosity, both as measured by mercury porosimetry, and CTE$_{RT\text{-}1000°\ C.}$ is the mean coefficient of thermal expansion between room temperature (approximately 22° C.) and 1000° C. in units of $10^{-7}$ C.$^{-1}$ as measured by dilatometry. In certain embodiments, the ratio of the measured flexural strength to the computed value of "5", (MOR/S), is at least about 1.05, at least about 1.10, at least about 1.15, at least about 1.20, and even at least about 1.25. A high value of MOR/S means that the ceramic body desirably has an especially high strength at a given set of values for % porosity, median pore diameter, and coefficient of thermal expansion.

Certain embodiments disclosed herein comprising at least one phase comprising zirconium tin titanate have a lower CTE at a given degree of microcracking relative to embodiments where tin is absent from the zirconium titanate phase. Likewise, certain embodiments disclosed herein may not require as much microcracking to provide a similar CTE as an embodiment wherein tin is absent from the zirconium titanate phase.

Microcracking may be the result of tensile stresses that develop between adjacent crystals in the ceramic body during cooling when the crystals have different CTEs from one another or when the crystals exhibit anisotropic CTEs along their different crystallographic directions. Although two ceramic bodies having approximately the same % porosity, median pore diameter, and CTE, will have approximately the same calculated "S" value, the embodiments disclosed herein that contain a zirconium tin titanate phase have been found to possess less microcracking and a higher MOR and higher MOR/S ratio. Therefore, embodiments disclosed herein may have a greater strength for a given CTE than embodiments where tin is absent from the zirconium titanate phase. Additionally, embodiments disclosed herein may have a lower CTE at the same level of microcracking as embodiments where tin is absent from the zirconium titanate phase, resulting in a greater thermal shock resistance for a given strength.

During heating of a ceramic body, the microcracks, which originally formed during the cooling of the ceramic body after firing, may gradually re-close. This process of re-closing may become more rapid above about 800° C. By about 1200° C., most of the microcracks have been eliminated by closure and annealing, resulting in a stiffening of the ceramic body and an increase in elastic modulus. During the initial stages of cooling from about 1200° C., the elastic modulus remains high because stresses between grains in the ceramic body are too low to cause microcracking. Below about 1000° C., however, the stresses between the grains increase to the point where microcracking may occur, and the elastic modulus may decrease with further cooling.

If a tangent line is drawn to the elastic modulus values during the initial stages of the cooling curve, such as at about 1100° C., then the extrapolation of this tangent line to room temperature yields the value of the elastic modulus of the ceramic body at room temperature in a hypothetical non-microcracked state (E°$_{RT}$). See, for example, FIG. 6. The slope of the tangent line thus represents the change in the elastic modulus of a non-microcracked version of the ceramic body with temperature change, $\Delta E°/\Delta T$. This slope is negative because, during cooling, the stiffening of the atomic bonds within the crystal grains causes the elastic modulus of the crystals to increase. The value of E°$_{RT}$ and the slope of the tangent may also be affected by % porosity. However, the ratio of the slope to the value of E°$_{RT}$ is a constant.

The ratio of the room-temperature elastic modulus of a hypothetical ceramic body in the non-microcracked state, E°$_{RT}$, to the value of the room-temperature elastic modulus of an actual microcracked ceramic body, E$_{RT}$, is proportional to the amount of microcracking within the ceramic body, as more microcracking produces a lower value of E$_{RT}$ relative to the value of E°$_{RT}$.

In certain embodiments disclosed herein wherein the MOR is greater than the value of S, the ceramic body may comprise a microstructure wherein the raw materials have undergone complete or nearly complete reaction to form the desired pseudobrookite and zirconium tin titanate phases. This is because complete reaction may be associated with a high degree of sintering in which the individual crystals comprising the ceramic body are well bonded to one another, which is to say that a high proportion of the crystal surfaces are bonded to the surfaces of adjacent crystals, thereby maximizing the connectivity and contiguity of the solid phase at a given percentage of porosity in the ceramic body. Accordingly, the ceramic body should, in certain embodiments, be heated to a sufficiently high temperature and held at that temperature for a sufficient time such that, after firing, the ceramic body contains a minimum amount of rutile (crystalline $TiO_2$ phase) and a minimum amount of corundum.

It has been found that the presence of corundum in certain embodiments disclosed herein may be the result of a reaction between the pseudobrookite phase and the zirconium tin titanate phase during firing. It has been discovered that for a zirconium tin titanate phase to be in equilibrium with (i.e., coexist with) an $Al_2TiO_5$-based pseudobrookite phase during firing, the zirconium tin titanate phase should contain a certain minimum amount of titanium. If the zirconium tin titanate phase does not contain this minimum amount of titanium, it may react with the $Al_2TiO_5$-rich pseudobrookite phase so as to incorporate the titanium from the $Al_2TiO_5$-rich pseudobrookite phase into the crystal structure of the zirconium tin titanate phase, thereby also forming a free corundum (aluminum oxide) phase as one of the reaction products.

To avoid this reaction, it has been found that the amount of titanium in the zirconium tin titanate phase should be, according to certain embodiments disclosed herein, at least about 28-32 cation % when the material is fired at about 1500° C., and, in certain embodiments, at least about 35-38 cation % when the material is fired at about 1400° C. This is equivalent to about 28-32 mole % $TiO_2$ component in the zirconium tin titanate phase when the material is fired at about 1500° C., or at least about 35-38 mole % $TiO_2$ component in the zirconium tin titanate phase when the material is fired at about 1400° C. Any attempt to form a ceramic comprising an $Al_2TiO_5$-rich pseudobrookite phase and a zirconium tin titanate phase having less than the minimum required titanium content may, instead, result in a ceramic comprising an $Al_2TiO_5$-rich pseudobrookite phase with a corundum phase and a zirconium tin titanate phase having a titanium content equal to the minimum amount required for equilibrium with the $Al_2TiO_5$-rich pseudobrookite phase at the firing temperature.

For example, in certain embodiments, the ceramic body may contain less than about 2.0 weight percent of rutile and less than about 2.0 weight percent corundum. Higher amounts of rutile in combination with at least about 2.0 weight percent corundum may indicate incomplete formation of the pseudobrookite phase. In certain embodiments, incomplete formation of the pseudobrookite phase may be detrimental to the strength (MOR) of the ceramic body.

In order to achieve the best combination of high strength (high MOR/S) and low CTE, in certain embodiments disclosed herein, the fired ceramic body contains no more than about 15 wt % corundum. It is believed that larger amounts of corundum may contribute to an increased CTE of the ceramic due to the intrinsically high coefficient of thermal expansion of corundum, which is approximately $85 \times 10^{-7}$° $C.^{-1}$. It is speculated that the high CTE of corundum may also contribute to increased microcracking, which would contribute to a lower MOR, as discussed herein. Therefore, in certain embodiments, the ceramic body disclosed herein may not contain more than about 10 wt % corundum, and even not more than about 5 wt % corundum or not more than about 2 wt % corundum.

Furthermore, in order to provide a ceramic body comprising an $Al_2TiO_5$-based pseudobrookite phase and a zirconium tin titanate phase in which the zirconium tin titanate phase has the lowest possible mean lattice coefficient of thermal expansion, in certain embodiments, one may select a bulk composition and a firing temperature that will allow for the stable coexistence of the $Al_2TiO_5$-based pseudobrookite phase with a zirconium tin titanate phase having the lowest possible titanium content without formation of more than about 15 wt % corundum by reaction with the pseudobrookite phase during firing.

Unless otherwise indicated, all numbers used in the specification and claims are to be understood as being modified in all instances by the term "about," whether or not so stated. It should also be understood that the precise numerical values used in the specification and claims form additional embodiments of the disclosure. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

It is to be understood that both the foregoing general description and the detailed description are exemplary and explanatory only and are not intended to be restrictive.

The accompanying drawings, which are incorporated in and constitute a part of this specification, are not intended to be restrictive, but rather illustrate embodiments of the disclosure.

Other embodiments will be apparent to those skilled in the art from consideration of the specification and practice of the disclosure.

EXAMPLES

The following examples are not intended to be limiting of the disclosure.

Example

Unit Cell Dimensions

Before the ceramic bodies discussed below in Examples 1-30 were prepared, a series of compositions in the $ZrO_2$—$TiO_2$—$SnO_2$ system were synthesized at temperatures of 1500° C. and 1600° C. to define the limit of $ZrTiO_4$ solid solution in the ternary system at these temperatures and to quantify the changes in the unit cell dimensions and lattice coefficients of thermal expansion as a function of the composition. Samples were prepared from mixtures of powders of the end-member oxides, which were blended with methyl cellulose and plasticized by the addition of water in a stainless steel muller. These materials were then extruded as 8 mm diameter rod using a ram extruder, dried, and fired in an electric furnace by heating at 50° C./h, holding 10 hours at maximum temperature, and cooling at 500° C./h. The phases in the fired material and their weight percentages were determined by powder x-ray diffractometry using a Rietveld refinement of the data.

Figure 2:
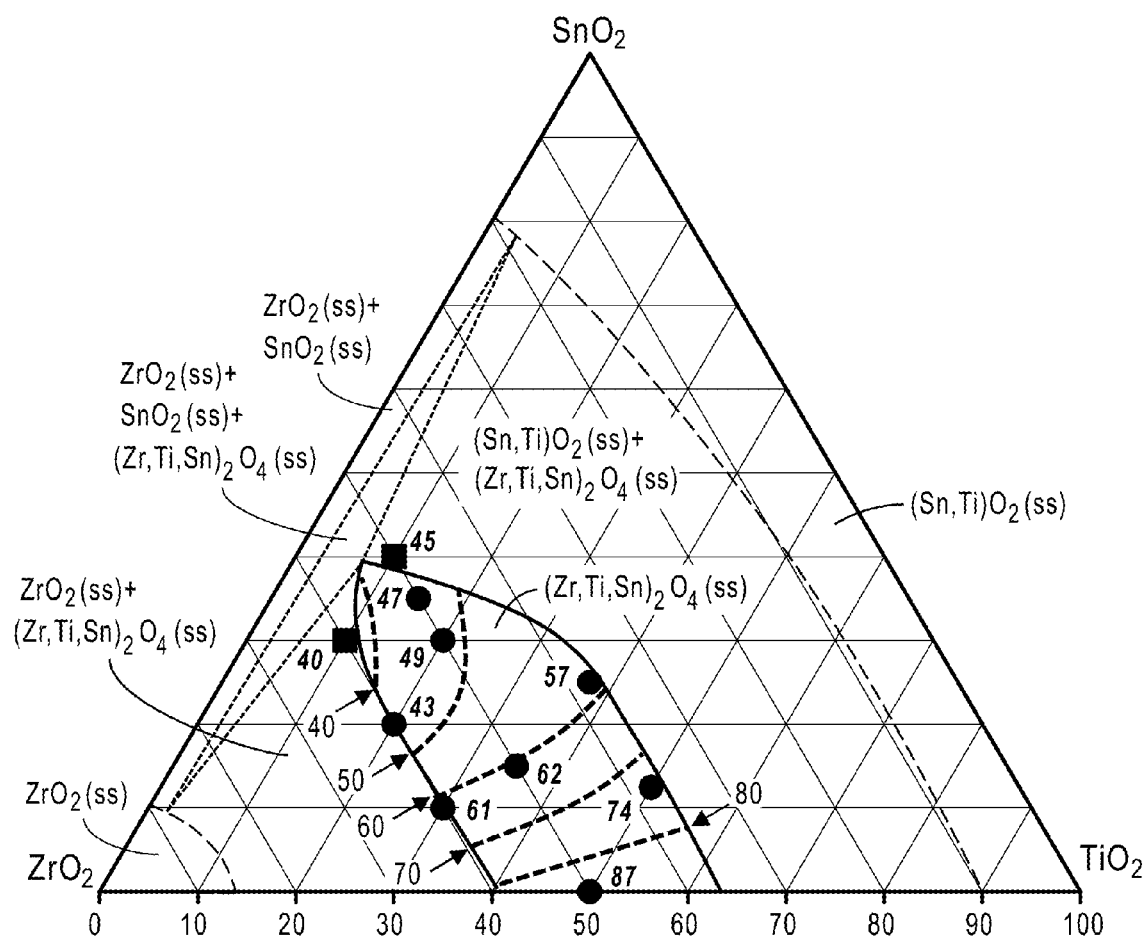
FIG. 2 shows a ternary composition diagram in mole percentages of $ZrO_2$, $SnO_2$, and $TiO_2$ components showing the approximate extent of solid solution (ss) of the zirconium tin titanate based phase, "$(Zr,Ti,Sn)_2O_4$ (ss)," at 1500-1600° C. The extent of solid solubility in the zirconium oxide phase, "$ZrO_2$ (ss)," and the tin oxide and titanium oxide (rutile) phase, "$SnO_2$ (ss)" and "$(Sn,Ti)O_2$ (ss)," are only schematic and not measured. Also shown are symbols denoting specific compositions of single-phase zirconium tin titanate compounds (filled circles) and compositions that yield predominantly single-phase zirconium tin titanate compounds with minor amounts of zirconium oxide solid solution, "$ZrO_2$ (ss)," or tin oxide solid solution, "$SnO_2$ (ss)," (filled squares). The mean linear lattice CTE of the respective zirconium tin titanate compounds from room temperature to 1000° C., as determined by high-temperature x-ray diffractometry, are shown next to the composition symbols. Dashed curves within the zirconium tin titanate phase field indicate compositions of constant CTE with values noted by arrows.

The crystal lattice axial CTE values (i.e., the CTE values along the directions of the "a," "b," and "c" unit cell dimensions) were subsequently determined by high-temperature x-ray diffractometry for those compositions which yielded single-phase, or nearly single-phase, $(Zr,Ti,Sn)_2O_4$ materials when fired at 1500-1600° C. These compositions are listed in Table 1, along with their room-temperature unit cell dimensions and their lattice CTE values. The mean lattice CTE value is the average of the three crystal lattice axial CTE values. The approximate extent of solid solution of the (Zr,Ti,Sn)$_2$O$_4$ phase at 1600° C. is depicted in FIG. 2. Also shown in FIG. 2 are the locations of the specific compositions in Table 1, as well as their mean lattice CTE values. A series of dashed contour lines denote the approximate location of compositions having the same CTE values of 40, 50, 60, 70, and 80×10$^{-7}$° C.$^{-1}$. The data in Table 1 and FIG. 2 demonstrate the reduction in the mean lattice CTE of (Zr,Ti,Sn)$_2$O$_4$ with decreasing titanium content and increasing tin content. At the highest ratios of Sn/Ti, the mean lattice CTE is further reduced with increasing zirconium content.

The unit cell dimensions listed in Table 1 were fit by least-squares multiple linear regression analysis to yield the following three equations, in which "Zr," "Sn," and "Ti" are the number of zirconium, tin, and titanium atoms, respectively, in a four-oxygen (two cation) formula unit:

"a" unit cell dimension (Å)=4.56705+0.239524(Zr)+ 0.061806(Sn) 98.5% R$^2$    EQ. 2:

"b" unit cell dimension (Å)=5.07079+0.21806(Zr)+ 0.707332(Sn)−0.321695(Sn)$^2$+0.13948(Ti)$^2$ 99.8% R$^2$    EQ. 3:

"c" unit cell dimension (Å)=5.25636−0.0489722(Zr)− 0.182123(Ti) 99.8% R$^2$    EQ. 4:

Table 1 below shows the values of the a, b, and c unit cell dimensions at room temperature, and mean lattice coefficients of thermal expansion of the a, b, and c unit cell dimension between room temperature and 1000° C., and the average of the three lattice CTE values, for zirconium titanate and various zirconium tin titanate compounds. The compositions are indicated by the number of atoms per four-oxygen formula unit, and CTE values are in units of 10$^{-7}$° C.$^{-1}$.

approximately 50-60% in the fired ware, which is a range that may be appropriate for use of the ceramic bodies as a diesel particulate filter, although the ceramic bodies disclosed herein are not limited by % porosity or by application.

To the combination of inorganic and pore-former powders were added 4.5 parts by weight of methyl cellulose and 1.0 parts by weight of tall oil, and sufficient water was added to the mixture in a stainless steel muller to provide a plasticized batch. Each batch was subsequently loaded into the chamber of a ram extruder, de-aired by pulling a vacuum on the chamber, and pushed through a die to form 60 cm lengths of 8 mm diameter rod. The rod was dried at 85° C. in open-ended glass tubes, cut into 3-inch and 6-inch lengths, placed in alumina trays, and fired in air in an electric furnace at 50° C./h to either 1400 or 1500° C., held for 15 hours, and cooled at 500° C./h to room temperature.

The % porosity and pore size distribution of the fired ware were determined by mercury porosimetry. Tables 2-6 list the values of the d$_{10}$, d$_{50}$, and d$_{90}$ pore sizes (in micrometers), which are the pore diameters at 10%, 50% and 90% of the cumulative pore size distribution curve based upon pore volume, such that d$_{90}$ is the pore diameter at which 10% of the pore volume of the sample has been intruded by mercury, d$_{50}$ is the pore diameter at which 50% of the pore volume of the sample has been intruded by mercury, and d$_{10}$ is the pore diameter at which 90% of the pore volume of the sample has been intruded by mercury. Thus, d$_{10}$<d$_{50}$<d$_{90}$.

Also provided in Tables 2 to 6 are the values of (d$_{90}$−d$_{10}$)/d$_{50}$, (d$_{90}$−d$_{50}$)/d$_{50}$, and (d$_{50}$−d$_{10}$)/d$_{50}$, which are normalized measures of the overall breadth of the pore size distribution, the breadth of the coarse end of the distribution, and breadth of the fine end of the distribution, respectively. Lower values of these metrics correspond to narrower pore size distributions, and a narrow pore size distribution, especially in the fine half of the distribution curve, may be beneficial for pro-

TABLE 1

| Formula | Zr/4ox | Ti/4ox | Sn/4ox | a (Å) | b (Å) | c (Å) | CTE(a) | CTE(b) | CTE(c) | CTE(avg) |
|---|---|---|---|---|---|---|---|---|---|---|
| ZrTiO$_4$ | 1.00 | 1.00 | 0.00 | 4.8059 | 5.4287 | 5.0274 | 69.3 | 103.3 | 87.1 | 86.6 |
| Zr$_{0.75}$TiSn$_{0.25}$O$_4$ | 0.75 | 1.00 | 0.25 | 4.7564 | 5.5321 | 5.0392 | 85.3 | 58.3 | 76.9 | 73.5 |
| Zr$_{0.75}$Ti$_{0.75}$Sn$_{0.5}$O$_4$ | 0.75 | 0.75 | 0.50 | 4.7787 | 5.5826 | 5.0810 | 88.2 | 35.9 | 47.3 | 57.1 |
| ZrTi$_{0.7}$Sn$_{0.3}$O$_4$ | 1.00 | 0.70 | 0.30 | 4.8290 | 5.5408 | 5.0792 | 85.5 | 37.9 | 63.7 | 62.4 |
| Zr$_{1.20}$Ti$_{0.60}$Sn$_{0.20}$O$_4$ | 1.20 | 0.60 | 0.20 | 4.8745 | 5.5076 | 5.0835 | 81.9 | 38.3 | 63.4 | 61.2 |
| ZrTi$_{0.4}$Sn$_{0.6}$O$_4$ | 1.00 | 0.40 | 0.60 | 4.8453 | 5.6211 | 5.1351 | 101.4 | 2.4 | 44.1 | 49.3 |
| Zr$_{1.20}$Ti$_{0.40}$Sn$_{0.40}$O$_4$ | 1.20 | 0.40 | 0.40 | 4.8750 | 5.5922 | 5.1257 | 113.4 | −23.4 | 40.3 | 43.4 |
| ZrTi$_{0.3}$Sn$_{0.7}$O$_4$ | 1.00 | 0.30 | 0.70 | 4.8500 | 5.6408 | 5.1531 | 104.1 | −1.5 | 38.4 | 47.0 |
| ZrTi$_{0.2}$Sn$_{0.8}$O$_4$ | 1.00 | 0.20 | 0.80 | 4.8614 | 5.6547 | 5.1694 | 108.2 | −7.0 | 34.2 | 45.1 |
| Zr$_{1.20}$Ti$_{0.20}$Sn$_{0.60}$O$_4$ | 1.20 | 0.20 | 0.60 | 4.8823 | 5.6420 | 5.1646 | 117.1 | −26.5 | 29.8 | 40.1 |

Examples 1-29

Examples of embodiments disclosed herein, based upon aluminum titanate+zirconium tin titanate or magnesium aluminum titanate+zirconium tin titanate, and comparative examples, based upon aluminum titanate±tin-free zirconium titanate or magnesium aluminum titanate±tin-free zirconium titanate, are presented in Tables 2 to 6 below.

End member oxide powders were used with the exception that a spinel (MgAl$_2$O$_4$) powder was employed to supply the magnesium. Median particle diameters, as determined by laser diffraction, are listed for each of the inorganic powders. In addition to the inorganic constituents, 12 parts by weight of a graphite powder (49 μm median particle diameter) and 22 parts by weight of a cross-linked pea starch were added to 100 parts by weight of the inorganic powders to serve as pore formers. This was done in an effort to yield porosity levels of viding low pressure drop in the soot-loaded state, for example when the ceramic body is used as a diesel particulate filter. A narrow pore size distribution, especially in the coarse half of the distribution curve, may also be beneficial for improved flexural strength, as low values of (d$_{90}$−d$_{50}$)/d$_{50}$ may imply an absence of large pores that can serve as strength-limiting flaws.

The thermal expansion of the ceramic body along the length of a 2-inch rod was measured from room temperature to 1000° C. using a push-rod dilatometer, and values of the mean ("secant") coefficients of thermal expansion between room temperature and 1000° C., and between 500° C. and 1000° C., both during heating, are listed in Tables 2 to 6.

Modulus of rupture was measured at room temperature on 3-inch long rods using the four-point method with a 0.75-inch load span and a 2.0-inch support span.

Young's elastic modulus values of certain examples were measured at room temperature using a sonic resonance technique. For selected examples, elastic modulus was further measured by a sonic resonance technique from room temperature up to 1200° C., and back to room temperature, at intervals of approximately 50° C.

The weight percentages of all crystalline phases in the fired ceramics were determined by powder x-ray diffractometry and applying a Rietveld analysis to the data, which also provided the unit cell parameters of the pseudobrookite and zirconium titanate based phases. Equations 2 to 4 were used to estimate the number of atoms of Zr, Sn, and Ti in the formula units of the zirconium titanate and zirconium tin titanate phases based upon their unit cell parameters, using a least-squares iterative procedure in which the values of "Zr," "Sn," and "Ti" were adjusted until the unit cell dimensions predicted from the equations exhibited the minimum deviation from the measured values.

Selected samples were also examined by scanning electron microscopy, and the compositions of the pseudobrookite and zirconium titanate and zirconium tin titanate phases determined directly by electron probe microanalysis.

For some examples, the thermal stability of the ceramic body in the presence of copper (II) oxide was characterized. First, a quantity of the ceramic was pulverized for 30 seconds in a bench-top ring mill to a median particle diameter of about 20 μm to about 40 μm. Three to five grams of pulverized ceramic were transferred to a 12 ml polypropylene container, and 0.25 wt % of copper (II) oxide powder from Sigma Aldrich was added. The container was placed on a SPEX Sample Prep 8000M Mixer/Mill and shaken for 5 minutes to homogenize the powders. The mixture was transferred to an alumina crucible and heated in an electric furnace at 120° C./h to 800° C., 300° C./h to 1100° C., held at 1100° C. for 2 hours, and cooled at 300° C./h to room temperature. The weight percentages of pseudobrookite, corundum, rutile, and zirconium titanate based phase after heat treatment were measured by x-ray diffractometry using Rietveld refinement. The stability of the pseudobrookite phase in the presence of the copper oxide was quantified by taking the ratio of weight percent pseudobrookite phase after the copper test to the weight percent of pseudobrookite phase in the original as-fired ceramic.

Examples of comparative materials to those of inventive ceramic bodies are provided in Tables 2 and 3.

The comparative examples in Table 2 are porous ceramic bodies comprised mainly of a pseudobrookite-type phase with small amounts of residual corundum or rutile, but lacking a zirconium titanate based phase. The pseudobrookite phase in Examples 1 and 2 is essentially pure $Al_2TiO_5$, and in Examples 3 and 4 the pseudobrookite phase is approximately 93.4 mole % $Al_2TiO_5$ and 6.6 mole % $MgTi_2O_5$. The ratios of the MOR values of these comparative examples to their calculated "S" values were less than 1.0, and their MOR values were plotted against their "S" values in FIG. 3 (triangles).

The comparative examples in Table 3 represent ceramic bodies comprised of a magnesium-free $Al_2TiO_5$ phase and a tin-free zirconium titanate phase (Examples 5 to 7) or a magnesium-containing $Al_2TiO_5$-based phase and a tin-free zirconium titanate phase (Examples 8 to 12). Electron probe microanalysis of the phases in Example 6 showed the presence of a small amount of zirconium in the pseudobrookite phase and a small amount of aluminum in the zirconium titanate phase. The presence of the larger zirconium cation in the pseudobrookite phase results in the slightly larger "a" and "b" unit cell dimensions of the pseudobrookite phase relative to those of the $Al_2TiO_5$ in Example 2, wherein no zirconium is present. The even larger unit cell dimensions of the pseudobrookite phases in Examples 8 to 12 are the result of the presence of magnesium in the crystal structure. The ratios of the MOR values to the computed "S" values for Examples 5 to 12 are all less than 1.0, ranging from 0.67 to 0.88, and the MOR values are plotted against "S" values in FIG. 3 (shown as open squares).

Examples of embodiments disclosed herein comprising a magnesium-free $Al_2TiO_5$-based pseudobrookite phase and a zirconium tin titanate phase (Examples 13 and 14) and further embodiments comprising a magnesium-containing $Al_2TiO_5$-based pseudobrookite phase and a zirconium tin titanate phase (Examples 15 to 23) for which the ratio MOR/S is greater than 1.0 are provided in Tables 4 and 5.

The examples in Tables 4 and 5 encompass values of porosity (51 to 61%), median pore diameters (11 to 15 μm), $(d_{90}-d_{10})/d_{50}$ (0.24 to 0.50), $(d_{50}-d_{10})/d_{50}$ (0.17 to 0.43), and CTE ($-15$ to $+29 \times 10^{-7}$ °$C.^{-1}$) which may be appropriate for use as a diesel particulate filter. However, variation in any of these physical properties to produce a ceramic body comprising at least one phase comprising pseudobrookite and at least one phase comprising zirconium tin titanate for other applications could be achieved through changes in raw material particle size, raw material mineralogy, and firing cycle, for example, without departing from the scope of the embodiments disclosed herein.

Figure 3:
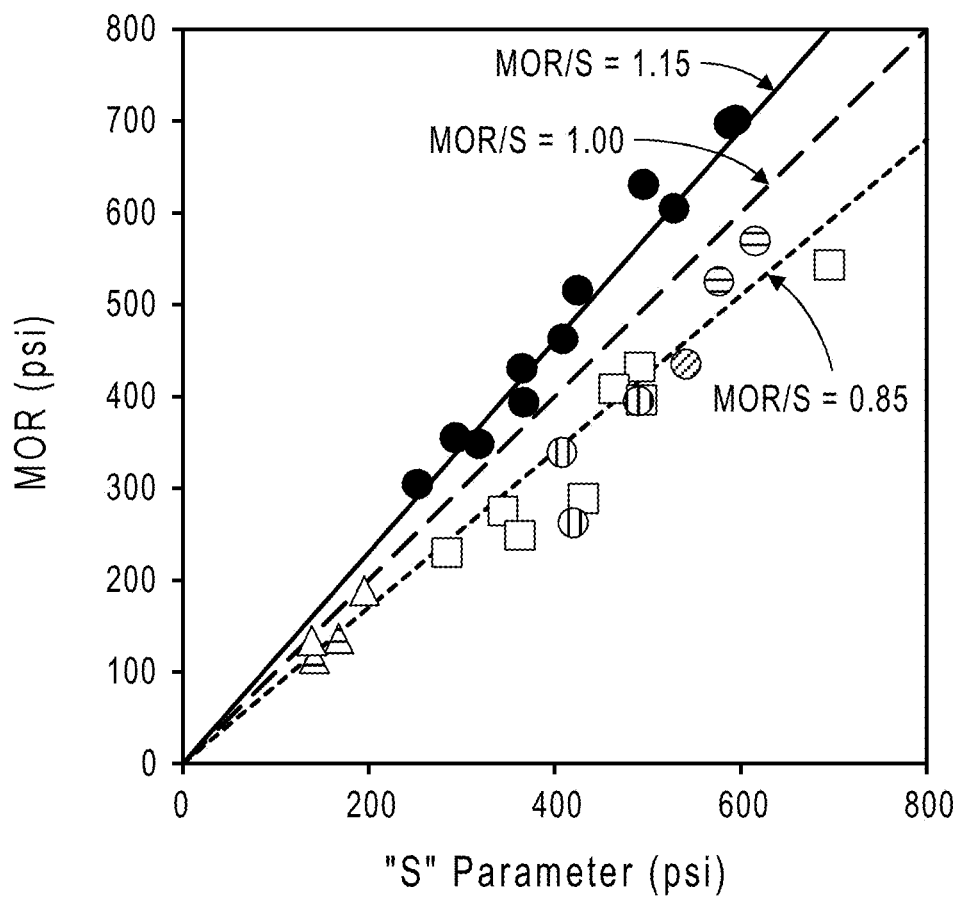
FIG. 3 is a plot of the measured four-point modulus of rupture (MOR) versus the calculated "S" parameter for pseudobrookite and zirconium tin titanate ceramics with not more than 2% rutile and not more than 15% corundum (filled circles); pseudobrookite and zirconium tin titanate ceramics with more than 2% rutile (circles with vertical lines); pseudobrookite and zirconium tin titanate ceramics with more than 15% corundum (circles with horizontal lines); pseudobrookite and zirconium tin titanate ceramics with more than 2% rutile and more than 15% corundum (circle with diagonal lines); pseudobrookite and tin-free zirconium titanate ceramics (open squares); $Al_2TiO_5$ based ceramics with no magnesium and no zirconium titanate phase (triangles with horizontal lines); and pseudobrookite ceramics comprising 93.4 mole % $Al_2TiO_5$ and 6.6 mole % $MgTi_2O_5$ with no zirconium titanate phase (open triangles). Lines indicate values of MOR/S=0.85, 1.00, and 1.15.

The values of MOR/S for the inventive examples of Tables 4 and 5 range from 1.07 to 1.27, and MOR is plotted versus the computed "S" parameter in FIG. 3 (shown as solid-filled circles). Comparison with the data from Tables 2 and 3 shows that the presence of a zirconium tin titanium oxide phase in these inventive examples results in a greater flexural strength for a given % porosity, $d_{50}$, and CTE.

Figure 4:
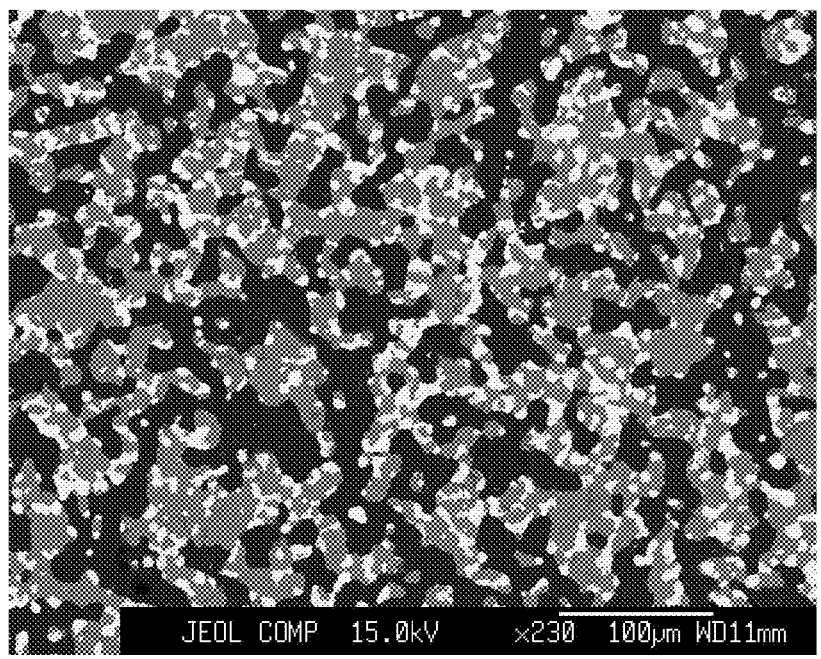
FIG. 4 shows a scanning electron micrograph of a polished cross section of Example 16 showing the homogeneously distributed zirconium tin titanate phase (white), the magnesium-containing $Al_2TiO_5$ based pseudobrookite phase (gray), and the well-interconnected porosity (black).

A scanning electron micrograph of a polished cross section of inventive Example 16 is provided in FIG. 4, showing the uniform distribution of the zirconium tin titanate phase (brighter regions) and the highly uniform porosity (black regions).

Examples 24 to 26 of Table 6 also represent inventive ceramic bodies comprising predominantly a magnesium-containing $Al_2TiO_5$-rich pseudobrookite phase and a zirconium tin titanate phase. However, the substantial amounts of corundum in these samples, comprising greater 15% by weight corundum, are associated with lower values of MOR/S, which are, for example, less than 1.0. The MOR and S values of these examples are plotted in FIG. 3 (shown as circles with horizontal or diagonal lines), from which the lower values of strength for a given "S" value are apparent. It has been found that high MOR/S values in the inventive ceramic bodies may require that the amount of corundum in the fired ware should be, for example, less than about 15 wt %.

As discussed above, it has been found that the presence of corundum in the inventive compositions, which ranges from about 2% to about 15% in the ceramic bodies of Tables 4 and 5 and about 6% to about 22% in the ceramic bodies of Table 6, is largely the result of a reaction between the pseudobrookite phase and the zirconium tin titanate phase during firing.

To illustrate this point, the batch composition of Example 18 was calculated to form a ceramic comprising 67 mole % of a pseudobrookite phase having the nominal composition $Mg_{0.066}Al_{1.868}Zr_{0.05}Ti_{0.92}Sn_{0.10}O_5$ and 33 mole % of a zirconium tin titanate phase having the nominal composition $Zr_{1.17}Ti_{0.39}Sn_{0.39}Al_{0.05}O_{3.975}$. However, after firing Example 18 at 1500° C. for 15 hours, the composition of the zirconium tin titanate phase was determined by electron probe microanalysis to be approximately $Zr_{0.96}Ti_{0.62}Sn_{0.38}Al_{0.04}O_{3.98}$ and that of the pseudobrookite-type phase was approximately $Mg_{0.108}Al_{1.824}Zr_{0.03}Ti_{0.98}Sn_{0.06}O_5$. The sample also contained 12 weight % corundum, but no rutile. The abundance of corundum and absence of rutile indicates that the corundum is not the result of incomplete reaction, but has formed as a stable reaction product between the pseudobrookite and zirconium tin titanate phase. The titanium content of the actual zirconium tin titanate phase is substantially greater than that of the targeted composition for that phase, and the magnesium content of the pseudobrookite-type phase is also higher than targeted. These compositional differences between the actual and targeted phase compositions are the result of extraction of the titanium from the pseudobrookite-type phase and its dissolution into the zirconium tin titanate phase, and the expulsion of the excess alumina in the pseudobrookite-type phase to form corundum, whereby the ratio of $MgTi_2O_5$ component to $Al_2TiO_5$ component in the pseudobrookite-type phase increased, resulting in the higher magnesium content of the pseudobrookite-type phase.

Figure 5:
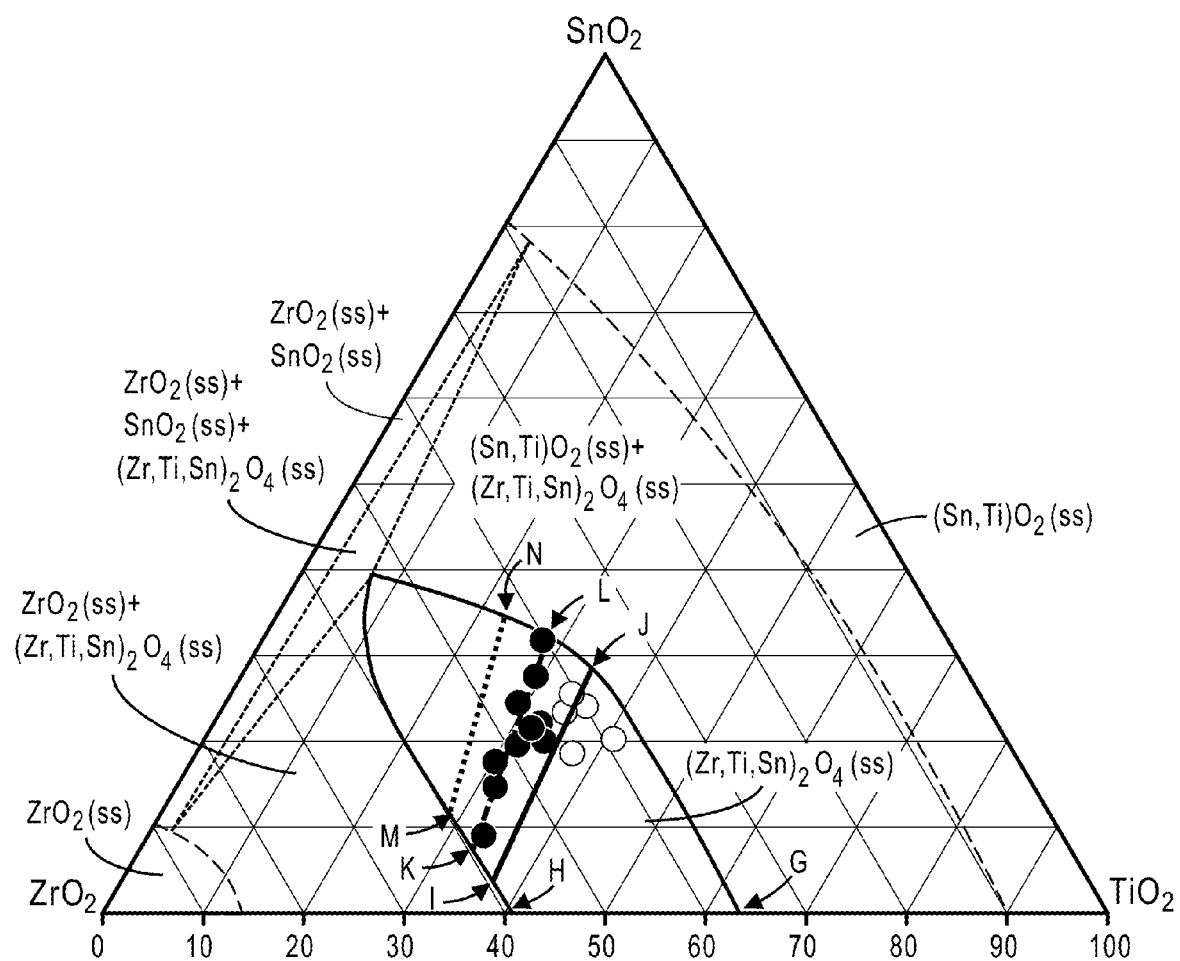
FIG. 5 is a ternary composition diagram in mole percentages of $ZrO_2$, $SnO_2$, and $TiO_2$ components showing the compositions of zirconium tin titanate phases coexisting with an $Al_2TiO_5$ based pseudobrookite phase and a corundum phase at 1400° C. (open circles) and at 1500° C. (filled circles). The lines I-J, K-L, and M-N indicate the approximate minimum titanium content in exemplary zirconium tin titanate phases that may coexist in stable equilibrium with an $Al_2TiO_5$ based pseudobrookite phase at 1400° C., 1500° C., and 1600° C., respectively.

FIG. 5 illustrates the compositions of zirconium tin titanate phases, as determined by either electron probe microanalysis or from the unit cell dimensions measured by x-ray diffractometry, for some of the inventive ceramic examples from Tables 4 to 6 that also contain an $Al_2TiO_5$-rich pseudobrookite phase and corundum. The compositions of the zirconium tin titanate phases from the samples fired at 1400° C. are denoted by open circles, and those from samples fired at 1500° C. are denoted by filled circles. The solid line I-J indicates the approximate lower limit of titanium in zirconium tin titanate phases that can stably coexist with an $Al_2TiO_5$-based pseudobrookite phase at 1400° C., and the long-dashed line K-L indicates the approximate lower limit of titanium in zirconium tin titanate phases that can stably coexist with an $Al_2TiO_5$-based pseudobrookite phase at 1500° C. It is apparent that the range of compositions of the zirconium tin titanate phase that can coexist with an $Al_2TiO_5$-based pseudobrookite phase expands toward lower titanium contents with increasing firing temperature. The short-dashed line M-N indicates the speculative lower limit of titanium in zirconium tin titanate phases that might stably coexist with an $Al_2TiO_5$-based pseudobrookite phase fired at 1600° C. It will be noted that Examples 24 to 26 in Table 6, fired at 1400° C., contain 18 to 22 wt % corundum and the estimated titanium contents of the zirconium tin titanate phases are 0.69 to 0.75 atoms per formula unit, whereas Examples 18 to 20 of Table 5, which represent the same bulk compositions fired at 1500° C., contain only 9 to 15 wt % corundum and the zirconium tin titanate phases contain only 0.56 to 0.61 atoms of titanium per formula unit. This further illustrates the extension of the compositions of the zirconium tin titanate phase in equilibrium with an $Al_2TiO_5$-based pseudobrookite phase to lower titanium contents with increasing firing temperature.

Accordingly and with reference to FIG. 5, in order to minimize the amount of corundum in the embodiments disclosed herein, the bulk composition of the ceramic body may be formulated to comprise only an $Al_2TiO_5$-based pseudobrookite phase and a zirconium tin titanate phase having a composition lying within the area bounded by G-H-I-J-G (and with at least 2.5 mole % $SnO_2$ component) if the body is to be fired at 1400° C., or within the area bounded by G-H-I-K-L-J-G (and with at least 2.5 mole % $SnO_2$ component) if the body is to be fired at 1500° C., or within the area bounded by G-H-I-K-M-N-L-J-G (and with at least 2.5 mole % $SnO_2$ component) if the body is to be fired at 1600° C.

Examples 27 to 29 in Table 6 demonstrate that when the ceramic body is not fully reacted such that there remains at least 2.0 wt % rutile and at least 2.0 wt % corundum in the fired ware, the value of MOR/S was found to be less than 1.0.

Figure 6:
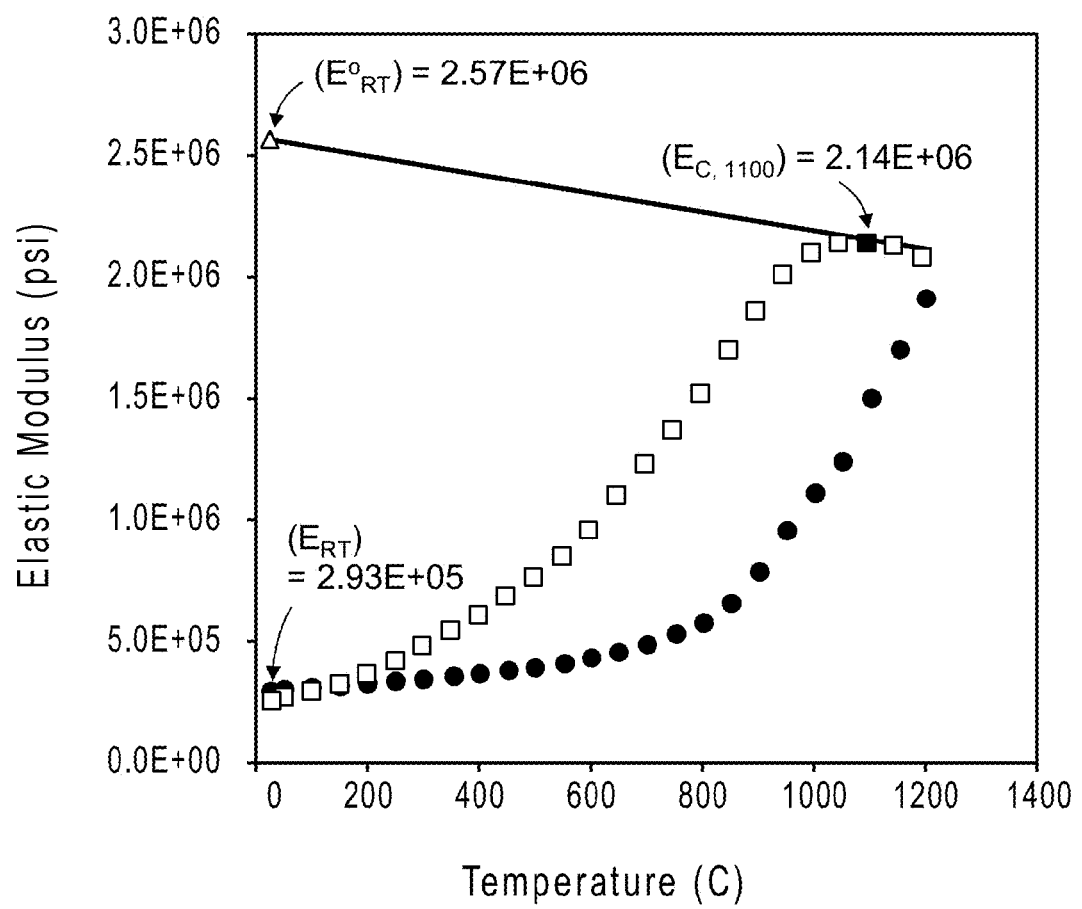
FIG. 6 is a plot of the Young's elastic modulus versus temperature during heating (shown as circles) and cooling (shown as squares) for inventive Example 17, showing the measured elastic modulus at room temperature before heating ($E_{RT}$), measured elastic modulus at approximately 1100° C. during cooling ($E_{c,\,1100}$), and the estimated value of the room-temperature elastic modulus for the sample in the absence of microcracking (shown as a triangle, $E°_{RT}$).
Figure 7:
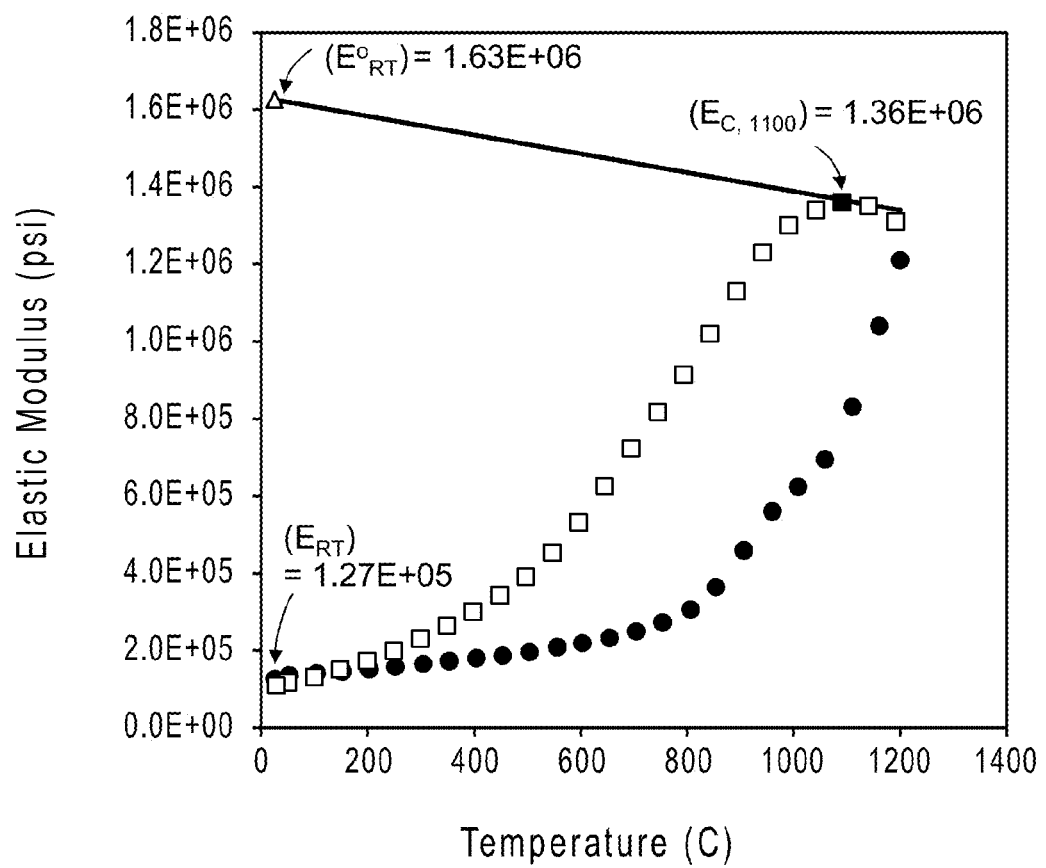
FIG. 7 is a plot of the Young's elastic modulus versus temperature during heating (shown as circles) and cooling (shown as squares) for comparative Example 12, showing the measured elastic modulus at room temperature before heating ($E_{RT}$), measured elastic modulus at approximately 1100° C. during cooling ($E_{c,\,1100}$), and estimated value of the room-temperature elastic modulus for the sample in the absence of microcracking (shown as a triangle, $E°_{RT}$).
Figure 8:
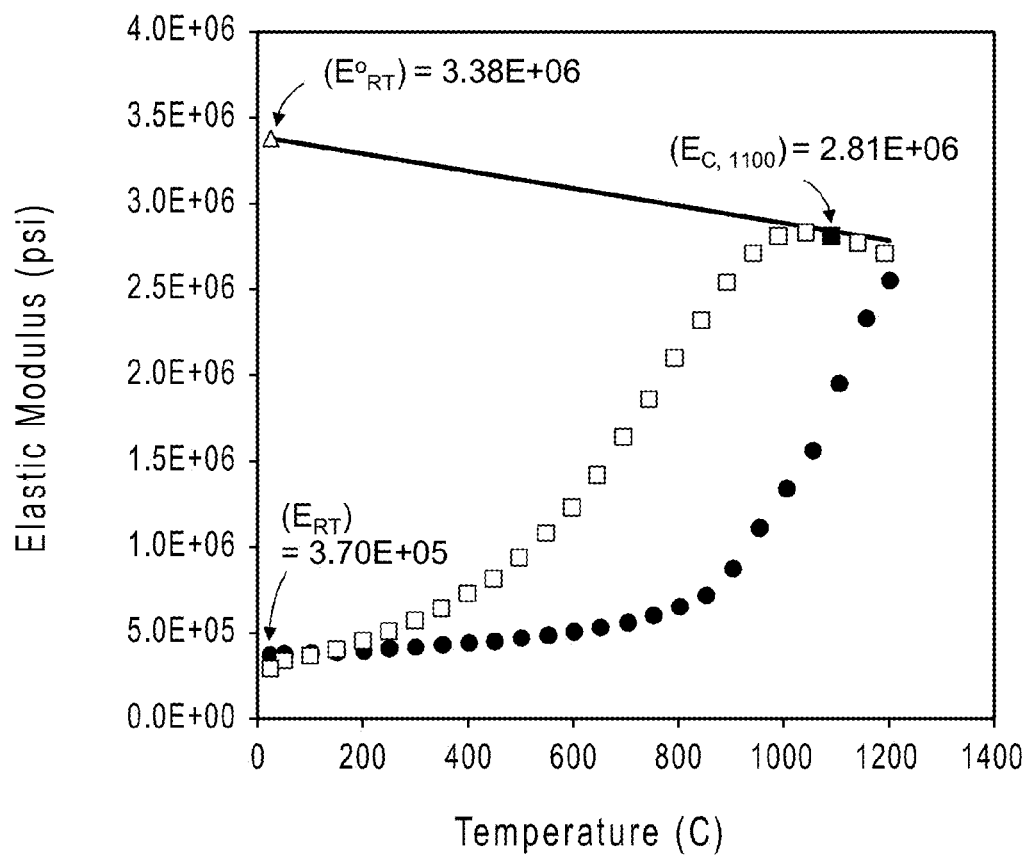
FIG. 8 is a plot of the Young's elastic modulus versus temperature during heating (shown as circles) and cooling (shown as squares) for comparative Example 10, showing the measured elastic modulus at room temperature before heating ($E_{RT}$), measured elastic modulus at approximately 1100° C. during cooling ($E_{c,\,1100}$), and estimated value of the room-temperature elastic modulus for the sample in the absence of microcracking (shown as a triangle, $E°_{RT}$).

To show the effect of microcracking on both strength and CTE, the extent of microcracking in three examples (inventive Example 17 and comparative Examples 10 and 12) was estimated from high-temperature elastic modulus measurements. In FIGS. 6-8, Young's elastic modulus is shown as a function of temperature during heating to about 1200° C. and cooling back to room temperature. A value of $-1.5 \times 10^{-4}$ °C.$^{-1}$ has been adopted for the value of $(\Delta E°/\Delta T)/E°_{RT}$ in FIGS. 6-8, where the superscript "°" indicates the ceramic in a non-microcracked state. FIGS. 6, 7, and 8 show plots of the Young's elastic modulus versus temperature during heating (shown as circles) and cooling (shown as squares) for inventive Example 17, comparative Example 12, and comparative Example 10, respectively. The plots illustrate the measured elastic modulus at room temperature before heating ($E_{RT}$), measured elastic modulus at approximately 1100° C. during cooling ($E_{c,1100}$), and estimated value of the room-temperature elastic modulus for the sample in the absence of microcracking (triangle, $E°_{RT}$).

Inventive Example 17 was compared with comparative Example 12. Both samples had similar values of CTE and % porosity. Example 17 contained 26.3 weight percent zirconium tin titanate of approximate composition $Zr_{0.95}Sn_{0.42}Ti_{0.63}O_4$, while Example 12 contained 26.0 weight percent of $ZrTiO_4$ (see Tables 3 and 4). The value of $E°_{RT}$ for Example 17 was determined to be $2.57 \times 10^6$ psi, and the value of $E_{RT}$ was determined to be $2.93 \times 10^5$ psi, giving a ratio $E°_{RT}/E_{RT}=8.8$. The value of $E°_{RT}$ for Example 12 was determined to be $1.63 \times 10^6$ psi, and the value of $E_{RT}$ was determined to be $1.27 \times 10^5$ psi, giving a ratio $E°_{RT}/E_{RT}=12.8$. The higher $E°_{RT}/E_{RT}$ ratio of comparative Example 12 demonstrates a higher level of microcracking in that sample. This greater amount of microcracking causes the MOR of comparative Example 12, which is 230 psi, to be lower than that of inventive Example 17, which is 393 psi. Also, the ratio of MOR/S for comparative Example 12, 0.81, is lower than that of inventive Example 17, which is 1.07. The higher ratio of MOR/S of the inventive Example 17 indicates that, for a given % porosity, median pore diameter, and CTE, the inventive example is stronger than the comparative example, and this is the result of the lower degree of microcracking in the inventive example coupled with the lower mean lattice CTE of the zirconium tin titanate phase in Example 17 relative to that of the zirconium titanate phase in Example 12.

Inventive Example 17 was also compared with comparative Example 10. Both examples have approximately the same values of % porosity and MOR, but Example 10 has a higher CTE. The high-temperature elastic modulus data for Example 10 is shown in FIG. 8. The value of $E°_{RT}$ for Example 10 has been determined to be $3.38 \times 10^6$ psi, and the value of $E_{RT}$ was determined to be $3.70 \times 10^5$ psi, giving a ratio $E°_{RT}/E_{RT}=9.1$. Therefore, Example 10 has only slightly more microcracking than inventive Example 17. However, the $CTE_{RT-1000°C}$ of Example 10 is $24.6 \times 10^{-7}$ °C.$^{-1}$, 50% higher than that of inventive Example 17. This demonstrates that the embodiments disclosed herein comprising a zirconium tin titanate phase have a lower CTE at a given level of microcracking than the comparative bodies that lack tin in the zirconium titanate phase. The lower CTE of inventive Example 17 results in greater predicted thermal shock parameter $MOR/(E \cdot CTE_{500-1000°C}) = 492°$ C., compared to only 325° C. for comparative Example 10 at about the same level of microcracking. The lower CTE for a given level of microcracking in the preferred embodiment of Example 17 is again reflected in the higher value of MOR/S, 1.07, relative to that of comparative Example 10, which is 0.88.

TABLE 2

Comparative examples that do not contain a ZrTiO$_4$ phase

| | Example Number | | | |
|---|---|---|---|---|
| | 1 | 2 | 3 | 4 |
| Inorganic Raw Materials | | | | |
| Al$_2$O$_3$ 12.0 μm | 56.08 | 56.08 | 46.28 | 46.28 |
| ZrO$_2$ A 5.7 μm | 0 | 0 | 0 | 0 |
| ZrO$_2$ S 17.3 μm | 0 | 0 | 0 | 0 |
| SnO$_2$ 5.5 μm | 0 | 0 | 0 | 0 |
| TiO$_2$ 0.5 μm | 43.92 | 43.92 | 46.76 | 46.76 |
| Spinel 6.5 μm | 0 | 0 | 6.96 | 6.96 |
| Firing Conditions | | | | |
| Hold Temperature (° C.) | 1400 | 1500 | 1400 | 1500 |
| Hold Time (hours) | 15 | 15 | 15 | 15 |
| Fired Properties | | | | |
| % Porosity | 60.1 | 59.8 | 60.4 | 63.6 |
| d$_{10}$ | 9.8 | 11.0 | 10.3 | 12.0 |
| d$_{50}$ | 14.5 | 14.9 | 15.7 | 16.0 |
| d$_{90}$ | 15.8 | 16.6 | 16.9 | 17.5 |
| (d$_{50}$ − d$_{10}$)/d$_{50}$ | 0.32 | 0.27 | 0.35 | 0.25 |
| (d$_{90}$ − d$_{50}$)/d$_{50}$ | 0.09 | 0.11 | 0.07 | 0.09 |
| (d$_{90}$ − d$_{10}$)/d$_{50}$ | 0.41 | 0.37 | 0.42 | 0.34 |
| CTE$_{RT-1000° C.}$ (10$^{-7}$ °C.$^{-1}$) | −9.1 | −10.3 | 8.1 | 10.8 |
| CTE$_{500-1000° C.}$ (10$^{-7}$ °C.$^{-1}$) | −12.6 | −14.1 | 4.8 | 6.8 |
| MOR (psi) | 136 | 114 | 188 | 134 |
| "S" value (psi) | 168 | 142 | 196 | 139 |
| MOR/S ratio | 0.81 | 0.81 | 0.96 | 0.96 |
| Proportion and Composition of Phases | | | | |
| wt % Pseudobrookite | — | 97.1 | 95.5 | 98.7 |
| wt % Corundum | — | 2.3 | 2.8 | 1.2 |
| wt % Rutile | — | 0.6 | 1.7 | 0 |
| Wt % (Zr, Ti, Sn)O$_4$ | — | 0 | 0 | 0 |
| Pseudobrookite Lattice Parameter a | — | 9.431 | 9.455 | 9.454 |
| Pseudobrookite Lattice Parameter b | — | 9.642 | 9.666 | 9.664 |
| Pseudobrookite Lattice Parameter c | — | 3.594 | 3.602 | 3.601 |
| Al per Psb formula unit from EPMA | — | 2.007 | — | 1.873 |
| Ti per Psb formula unit from EPMA | — | 0.993 | — | 1.060 |
| Sn per Psb formula unit from EPMA | — | 0.000 | — | 0.000 |
| Zr per Psb formula unit from EPMA | — | 0.000 | — | 0.000 |
| Mg per Psb formula unit from EPMA | — | 0.000 | — | 0.066 |

TABLE 3

Comparative examples that contain a tin-free ZrTiO$_4$ phase

| | Example Number | | | | | | | |
|---|---|---|---|---|---|---|---|---|
| | 5 | 6 | 7 | 8 | 9 | 10 | 11 | 12 |
| Inorganic Raw Materials | | | | | | | | |
| Al$_2$O$_3$ 12.0 μm | 44.86 | 33.65 | 22.43 | 34.93 | 26.20 | 26.20 | 26.20 | 31.58 |
| ZrO$_2$ A 5.7 μm | 12.13 | 24.27 | 36.40 | 12.13 | 0 | 24.27 | 24.27 | 0 |
| ZrO$_2$ S 17.3 μm | 0 | 0 | 0 | 0 | 24.27 | 0 | 0 | 22.46 |
| SnO$_2$ 5.5 μm | 0 | 0 | 0 | 0 | 0 | 0 | 0 | 0 |
| TiO$_2$ 0.5 μm | 43.00 | 42.08 | 41.16 | 45.84 | 44.21 | 44.21 | 44.21 | 42.84 |
| Spinel 6.5 μm | 0 | 0 | 0 | 7.10 | 5.32 | 5.32 | 5.32 | 3.13 |
| Firing Conditions | | | | | | | | |
| Hold Temperature (° C.) | 1500 | 1500 | 1500 | 1500 | 1400 | 1400 | 1500 | 1500 |
| Hold Time (hours) | 15 | 15 | 15 | 15 | 15 | 15 | 15 | 15 |
| Fired Properties | | | | | | | | |
| % Porosity | 51.9 | 48.8 | 44.6 | 52.4 | 60.5 | 58.5 | 50.2 | 57.7 |
| d$_{10}$ | 11.2 | 10.7 | 10.1 | 12.3 | 9.1 | 10.1 | 12.1 | 12.7 |
| d$_{50}$ | 13.8 | 12.9 | 12.0 | 15.1 | 13.6 | 13.4 | 14.2 | 15.9 |
| d$_{90}$ | 14.7 | 13.6 | 12.7 | 15.9 | 15.8 | 14.2 | 14.9 | 17.0 |
| (d$_{50}$ − d$_{10}$)/d$_{50}$ | 0.19 | 0.17 | 0.16 | 0.19 | 0.33 | 0.24 | 0.15 | 0.20 |
| (d$_{90}$ − d$_{50}$)/d$_{50}$ | 0.07 | 0.06 | 0.06 | 0.05 | 0.16 | 0.06 | 0.05 | 0.07 |
| (d$_{90}$ − d$_{10}$)/d$_{50}$ | 0.26 | 0.23 | 0.21 | 0.24 | 0.49 | 0.30 | 0.20 | 0.27 |
| CTE$_{RT-1000° C.}$ (10$^{-7}$ °C.$^{-1}$) | −11.3 | −4.4 | 8.2 | 5.8 | 27.2 | 24.6 | 12.3 | 15.9 |

TABLE 3-continued

Comparative examples that contain a tin-free ZrTiO$_4$ phase

| | Example Number | | | | | | | |
|---|---|---|---|---|---|---|---|---|
| | 5 | 6 | 7 | 8 | 9 | 10 | 11 | 12 |
| CTE$_{500-1000°\ C.}$ ($10^{-7}$ °C.$^{-1}$) | −0.6 | 6.2 | 17.4 | 15.0 | 36.5 | 34.0 | 23.1 | 25.0 |
| MOR (psi) | 275 | 432 | 543 | 249 | 288 | 408 | 396 | 230 |
| "S" value (psi) | 344 | 491 | 696 | 363 | 431 | 464 | 494 | 284 |
| MOR/S ratio | 0.80 | 0.88 | 0.78 | 0.69 | 0.67 | 0.88 | 0.80 | 0.81 |
| Elastic Modulus at RT (psi) | — | — | 4.82E+05 | 1.69E+05 | 2.18E+05 | 3.70E+05 | 2.94E+05 | 1.25E+05 |
| MOR/(E*CTE$_{500-1000°\ C.}$) | — | — | 647 | 980 | 362 | 325 | 584 | 725 |
| Proportion and Composition of Phases | | | | | | | | |
| wt % Pseudobrookite | 83.6 | 67.2 | 57.7 | 84.3 | 67.1 | 64.5 | 68.4 | 73.0 |
| wt % Corundum | 0.7 | 0.7 | 0 | 0.7 | 3.0 | 2.0 | 0.5 | 0.0 |
| wt % Rutile | 0.1 | 0.2 | 0 | 0.9 | 1.7 | 1.2 | 1.0 | 1.0 |
| Wt % ZrTiO$_4$ | 15.6 | 32.0 | 41.7 | 13.8 | 28.0 | 32.0 | 29.8 | 26.0 |
| Pseudobrookite Lattice Parameter a | 9.435 | 9.436 | 9.434 | 9.470 | 9.470 | 9.470 | 9.469 | 9.459 |
| Pseudobrookite Lattice Parameter b | 9.649 | 9.650 | 9.649 | 9.689 | 9.687 | 9.686 | 9.688 | 9.675 |
| Pseudobrookite Lattice Parameter c | 3.592 | 3.592 | 3.591 | 3.602 | 3.602 | 3.601 | 3.601 | 3.598 |
| ZrTiO$_4$ Lattice Parameter a | 4.798 | 4.805 | 4.807 | 4.805 | 4.802 | 4.803 | 4.807 | 4.822 |
| ZrTiO$_4$ Lattice Parameter b | 5.412 | 5.417 | 5.411 | 5.416 | 5.408 | 5.411 | 5.411 | 5.418 |
| ZrTiO$_4$ Lattice Parameter c | 5.025 | 5.028 | 5.028 | 5.028 | 5.025 | 5.026 | 5.028 | 5.034 |
| Approximate Zr per ZrTiO$_4$ from unit cell | 0.99 | 1.01 | 1.02 | 1.01 | 1.00 | 1.00 | 1.02 | 1.07 |
| Approximate Ti per ZrTiO$_4$ from unit cell | 1.01 | 0.99 | 0.98 | 0.99 | 1.00 | 1.00 | 0.98 | 0.93 |
| Approximate Sn per ZrTiO$_4$ from unit cell | 0.00 | 0.00 | 0.00 | 0.00 | 0.00 | 0.00 | 0.00 | 0.00 |
| Al per Psb formula unit from EPMA | — | 2.006 | — | — | — | — | — | — |
| Ti per Psb formula unit from EPMA | — | 0.975 | — | — | — | — | — | — |
| Sn per Psb formula unit from EPMA | — | 0.000 | — | — | — | — | — | — |
| Zr per Psb formula unit from EPMA | — | 0.019 | — | — | — | — | — | — |
| Mg per Psb formula unit from EPMA | — | 0.000 | — | — | — | — | — | — |
| Zr per ZTT formula unit from EPMA | — | 0.929 | — | — | — | — | — | — |
| Ti per ZTT formula unit from EPMA | — | 1.025 | — | — | — | — | — | — |
| Sn per ZTT formula unit from EPMA | — | 0.000 | — | — | — | — | — | — |
| Al per ZTT formula unit from EPMA | — | 0.046 | — | — | — | — | — | — |
| Mg per ZTT formula unit from EPMA | — | 0.000 | — | — | — | — | — | — |
| Oxygen per ZTT formula unit from EPMA | — | 3.977 | — | — | — | — | — | — |

TABLE 4

Exemplary embodiments that contain a zirconium tin titanate phase

| | Example Number | | | | |
|---|---|---|---|---|---|
| | 13 | 14 | 15 | 16 | 17 |
| Inorganic Raw Materials | | | | | |
| Al$_2$O$_3$ 12.0 μm | 44.86 | 33.65 | 27.77 | 27.77 | 26.20 |
| ZrO$_2$ A 5.7 μm | 10.03 | 20.07 | 20.07 | 20.07 | 0 |
| ZrO$_2$ S 17.3 μm | 0 | 0 | 0 | 0 | 20.07 |
| SnO$_2$ 5.5 μm | 7.36 | 14.73 | 14.73 | 14.73 | 14.73 |
| TiO$_2$ 0.5 μm | 37.74 | 31.56 | 33.26 | 33.26 | 33.69 |
| Spinel 6.5 μm | 0 | 0 | 4.18 | 4.18 | 5.32 |
| Firing Conditions | | | | | |
| Hold Temperature (° C.) | 1500 | 1500 | 1400 | 1500 | 1500 |
| Hold Time (hours) | 15 | 15 | 15 | 15 | 15 |
| Fired Properties | | | | | |
| % Porosity | 55.3 | 53.8 | 60.6 | 51.3 | 57.3 |
| d$_{10}$ | 10.9 | 10.3 | 6.3 | 9.3 | 11.7 |
| d$_{50}$ | 13.9 | 12.5 | 11.0 | 11.8 | 14.6 |
| d$_{90}$ | 15.1 | 13.4 | 11.7 | 12.6 | 15.6 |
| (d$_{50}$ − d$_{10}$)/d$_{50}$ | 0.22 | 0.17 | 0.43 | 0.21 | 0.20 |
| (d$_{90}$ − d$_{50}$)/d$_{50}$ | 0.09 | 0.07 | 0.07 | 0.07 | 0.07 |
| (d$_{90}$ − d$_{10}$)/d$_{50}$ | 0.31 | 0.24 | 0.50 | 0.28 | 0.27 |
| CTE$_{RT-1000°\ C.}$ ($10^{-7}$ °C.$^{-1}$) | −14.5 | 7.3 | 28.7 | 9.4 | 16.4 |
| CTE$_{500-1000°\ C.}$ ($10^{-7}$ °C.$^{-1}$) | 2.4 | 17.6 | 37.8 | 20.7 | 27.3 |
| MOR (psi) | 304 | 631 | 697 | 701 | 393 |
| "S" value (psi) | 253 | 495 | 588 | 595 | 367 |

TABLE 4-continued

Exemplary embodiments that contain a zirconium tin titanate phase

| | Example Number | | | | |
|---|---|---|---|---|---|
| | 13 | 14 | 15 | 16 | 17 |
| MOR/S ratio | 1.20 | 1.27 | 1.19 | 1.18 | 1.07 |
| Elastic Modulus at RT (psi) | 2.22E+05 | 4.82E+05 | 5.79E+05 | 5.14E+05 | 2.93E+05 |
| MOR/(E*CTE$_{500-1000° C.}$) * = estimated | 5803 | 743 | 319 | 660 | 492 |
| Proportion and Composition of Phases | | | | | |
| wt % Pseudobrookite | 80.9 | 59.8 | 48.2 | 62.3 | 69.2 |
| wt % Corundum | 2.5 | 6.6 | 9.8 | 2.9 | 3.6 |
| wt % Rutile | 0.4 | 1.0 | 0.5 | 0.2 | 1.0 |
| Wt % (Zr, Ti, Sn)O$_4$ | 16.2 | 35.6 | 41.6 | 34.5 | 26.3 |
| Pseudobrookite Lattice Parameter a | 9.451 | 9.457 | 9.485 | 9.486 | 9.497 |
| Pseudobrookite Lattice Parameter b | 9.671 | 9.680 | 9.709 | 9.713 | 9.726 |
| Pseudobrookite Lattice Parameter c | 3.592 | 3.591 | 3.600 | 3.598 | 3.601 |
| (Zr, Ti, Sn)O$_4$ Lattice Parameter a | 4.798 | 4.813 | 4.779 | 4.817 | 4.820 |
| (Zr, Ti, Sn)O$_4$ Lattice Parameter b | 5.548 | 5.569 | 5.567 | 5.576 | 5.574 |
| (Zr, Ti, Sn)O$_4$ Lattice Parameter c | 5.068 | 5.087 | 5.071 | 5.093 | 5.094 |
| Approximate Zr per ZrTiO$_4$ from unit cell | 0.88 | 0.92 | 0.78 | 0.93 | 0.95 |
| Approximate Ti per ZrTiO$_4$ from unit cell | 0.80 | 0.68 | 0.81 | 0.64 | 0.63 |
| Approximate Sn per ZrTiO$_4$ from unit cell | 0.33 | 0.40 | 0.41 | 0.43 | 0.42 |
| Al per Psb formula unit from EPMA | — | — | — | 1.880 | — |
| Ti per Psb formula unit from EPMA | — | — | — | 0.960 | — |
| Sn per Psb formula unit from EPMA | — | — | — | 0.065 | — |
| Zr per Psb formula unit from EPMA | — | — | — | 0.028 | — |
| Mg per Psb formula unit from EPMA | — | — | — | 0.066 | — |
| Zr per ZTT formula unit from EPMA | — | — | — | 0.885 | — |
| Ti per ZTT formula unit from EPMA | — | — | — | 0.636 | — |
| Sn per ZTT formula unit from EPMA | — | — | — | 0.431 | — |
| Al per ZTT formula unit from EPMA | — | — | — | 0.048 | — |
| Mg per ZTT formula unit from EPMA | — | — | — | 0.000 | — |
| Oxygen per ZTT formula unit from EPMA | — | — | — | 3.976 | — |

TABLE 5

Exemplary embodiments that contain a zirconium tin titanate phase, fired at 1500° C. for 15 hours

| | Example Number | | | | | |
|---|---|---|---|---|---|---|
| | 18 | 19 | 20 | 21 | 22 | 23 |
| Inorganic Raw Materials | | | | | | |
| Al$_2$O$_3$ 12.0 μm | 28.33 | 28.09 | 27.72 | 25.89 | 31.00 | 31.31 |
| ZrO$_2$ A 5.7 μm | 0 | 0 | 0 | 0 | 0 | 0 |
| ZrO$_2$ S 17.3 μm | 24.98 | 20.97 | 24.44 | 19.45 | 21.81 | 24.20 |
| SnO$_2$ 5.5 μm | 14.25 | 18.77 | 18.52 | 15.25 | 11.26 | 7.32 |
| TiO$_2$ 0.5 μm | 28.64 | 28.40 | 25.60 | 33.00 | 32.96 | 34.18 |
| Spinel 6.5 μm | 3.81 | 3.78 | 3.73 | 6.41 | 2.97 | 3.00 |
| Fired Properties | | | | | | |
| % Porosity | 59.1 | 59.5 | 56.3 | 57.7 | 59.2 | 58.7 |
| d$_{10}$ | 10.9 | 10.8 | 10.4 | 12.0 | 11.6 | 11.6 |
| d$_{50}$ | 14.1 | 13.9 | 13.4 | 14.9 | 14.9 | 15.2 |
| d$_{90}$ | 15.2 | 14.9 | 14.3 | 15.7 | 15.7 | 16.4 |
| (d$_{50}$ − d$_{10}$)/d$_{50}$ | 0.23 | 0.22 | 0.22 | 0.19 | 0.22 | 0.23 |
| (d$_{90}$ − d$_{50}$)/d$_{50}$ | 0.08 | 0.07 | 0.07 | 0.05 | 0.05 | 0.08 |
| (d$_{90}$ − d$_{10}$)/d$_{50}$ | 0.31 | 0.29 | 0.29 | 0.24 | 0.28 | 0.31 |
| CTE$_{RT-1000° C.}$ ($10^{-7}$ °C.$^{-1}$) | 26.6 | 23.0 | 28.5 | 19.6 | 17.1 | 13.9 |
| CTE$_{500-1000° C.}$ ($10^{-7}$ °C.$^{-1}$) | 36.2 | 32.8 | 37.3 | 29.2 | 24.6 | 6.8 |
| MOR (psi) | 515 | 462 | 604 | 430 | 348 | 355 |
| "S" value (psi) | 425 | 409 | 529 | 365 | 319 | 293 |
| MOR/S ratio | 1.21 | 1.13 | 1.14 | 1.18 | 1.09 | 1.21 |
| Elastic Modulus at RT (psi) | 4.56E+05 | 4.45E+05 | 5.68E+05 | 3.01E+05 | 2.58E+05 | 2.45E+05 |
| MOR/(E*CTE$_{500-1000° C.}$) | 312 | 316 | 286 | 489 | 550 | 2129 |
| Proportion and Composition of Phases | | | | | | |
| wt % Pseudobrookite | 56.0 | 61.0 | 52.0 | 82.0 | 77.0 | 80.0 |
| wt % Corundum | 12.0 | 9.2 | 15.0 | 1.9 | 4.4 | 1.6 |
| wt % Rutile | 0 | 0 | 0 | 1.0 | 1.0 | trace |
| Wt % (Zr,Ti,Sn)O$_4$ | 32.0 | 29.0 | 33.0 | 11.0 | 16.0 | 12.0 |

TABLE 5-continued

Exemplary embodiments that contain a zirconium tin titanate phase, fired at 1500° C. for 15 hours

| | Example Number | | | | | |
|---|---|---|---|---|---|---|
| | 18 | 19 | 20 | 21 | 22 | 23 |
| Wt % $ZrO_2$ | 0 | 0 | 0 | 4.3 | 1.2 | 6.9 |
| Pseudobrookite Lattice Parameter a | 9.498 | 9.502 | 9.510 | 9.501 | 9.477 | 9.471 |
| Pseudobrookite Lattice Parameter b | 9.724 | 9.729 | 9.738 | 9.729 | 9.700 | 9.693 |
| Pseudobrookite Lattice Parameter c | 3.600 | 3.600 | 3.602 | 3.603 | 3.597 | 3.597 |
| $(Zr, Ti, Sn)O_4$ Lattice Parameter a | 4.830 | 4.816 | 4.824 | 4.839 | 4.843 | 4.856 |
| $(Zr, Ti, Sn)O_4$ Lattice Parameter b | 5.571 | 5.595 | 5.592 | 5.559 | 5.542 | 5.503 |
| $(Zr, Ti, Sn)O_4$ Lattice Parameter c | 5.096 | 5.104 | 5.106 | 5.093 | 5.085 | 5.073 |
| Approximate Zr per $ZrTiO_4$ from unit cell | 0.99 | 0.90 | 0.94 | 1.04 | 1.07 | 1.15 |
| Approximate Ti per $ZrTiO_4$ from unit cell | 0.61 | 0.58 | 0.56 | 0.61 | 0.64 | 0.67 |
| Approximate Sn per $ZrTiO_4$ from unit cell | 0.40 | 0.51 | 0.49 | 0.35 | 0.29 | 0.18 |
| Al per Psb formula unit from EPMA | 1.824 | 1.844 | 1.812 | — | — | — |
| Ti per Psb formula unit from EPMA | 0.982 | 0.956 | 0.972 | — | — | — |
| Sn per Psb formula unit from EPMA | 0.064 | 0.080 | 0.076 | — | — | — |
| Zr per Psb formula unit from EPMA | 0.032 | 0.031 | 0.034 | — | — | — |
| Mg per Psb formula unit from EPMA | 0.108 | 0.098 | 0.118 | — | — | — |
| Zr per ZTT formula unit from EPMA | 0.958 | 0.842 | 0.908 | — | — | — |
| Ti per ZTT formula unit from EPMA | 0.619 | 0.576 | 0.572 | — | — | — |
| Sn per ZTT formula unit from EPMA | 0.384 | 0.538 | 0.479 | — | — | — |
| Al per ZTT formula unit from EPMA | 0.039 | 0.044 | 0.041 | — | — | — |
| Mg per ZTT formula unit from EPMA | 0.000 | 0.000 | 0.000 | — | — | — |
| Oxygen per ZTT formula unit from EPMA | 3.980 | 3.980 | | | | |

TABLE 6

Exemplary embodiments that contain a zirconium tin titanate phase for which MOR/S <1.0

| | Example Number | | | | | |
|---|---|---|---|---|---|---|
| | 24 | 25 | 26 | 27 | 28 | 29 |
| Inorganic Raw Materials | | | | | | |
| $Al_2O_3$ 12.0 μm | 28.33 | 28.09 | 27.72 | 34.93 | 26.20 | 30.41 |
| $ZrO_2$ A 5.7 μm | 0 | 0 | 0 | 0 | 0 | 0 |
| $ZrO_2$ S 17.3 μm | 24.98 | 20.97 | 24.44 | 10.03 | 20.07 | 17.20 |
| $SnO_2$ 5.5 μm | 14.25 | 18.77 | 18.52 | 7.36 | 14.73 | 18.90 |
| $TiO_2$ 0.5 μm | 28.64 | 28.40 | 25.60 | 40.58 | 33.69 | 30.59 |
| Spinel 6.5 μm | 3.81 | 3.78 | 3.73 | 7.10 | 5.32 | 2.90 |
| Firing Conditions | | | | | | |
| Hold Temperature (° C.) | 1400 | 1400 | 1400 | 1400 | 1400 | 1500 |
| Hold Time (hours) | 15 | 15 | 15 | 15 | 15 | 15 |
| Fired Properties | | | | | | |
| % Porosity | 65.0 | 64.5 | 63.5 | 59.9 | 61.8 | 56.1 |
| $d_{10}$ | 5.9 | 5.7 | 6.8 | 6.7 | 6.8 | 11.7 |
| $d_{50}$ | 11.7 | 11.8 | 11.8 | 13.0 | 12.4 | 14.4 |
| $d_{90}$ | 12.8 | 12.9 | 13.1 | 14.2 | 13.6 | 15.2 |
| $(d_{50} - d_{10})/d_{50}$ | 0.49 | 0.52 | 0.43 | 0.49 | 0.45 | 0.19 |
| $(d_{90} - d_{50})/d_{50}$ | 0.09 | 0.09 | 0.11 | 0.09 | 0.09 | 0.05 |
| $(d_{90} - d_{10})/d_{50}$ | 0.59 | 0.61 | 0.54 | 0.58 | 0.54 | 0.24 |
| $CTE_{RT-1000° C.}$ $(10^{-7}$ °$C.^{-1})$ | 46.3 | 40.3 | 48.7 | 18.0 | 29.5 | 17.9 |
| $CTE_{500-1000° C.}$ $(10^{-7}$ °$C.^{-1})$ | 54.1 | 48.4 | 57.3 | 27.1 | 38.5 | 27.7 |
| MOR (psi) | 525 | 436 | 569 | 262 | 395 | 339 |
| "S" value (psi) | 577 | 541 | 616 | 420 | 490 | 408 |
| MOR/S ratio | 0.91 | 0.80 | 0.92 | 0.62 | 0.81 | 0.83 |
| Elastic Modulus at RT (psi) | 5.37E+05 | 4.66E+05 | 6.32E+05 | 2.27E+05 | 3.38E+05 | 2.60E+05 |
| $MOR/(E*CTE_{500-1000° C.})$ *= estimated | 181 | 193 | 157 | 426 | 304 | 470 |
| Proportion and Composition of Phases | | | | | | |
| Wt % Pseudobrookite | 43.0 | 47.0 | 38.0 | 76.6 | 58.9 | 76.0 |
| Wt % Corundum | 20.0 | 18.0 | 22.0 | 6.6 | 10.0 | 6.2 |

TABLE 6-continued

Exemplary embodiments that contain a zirconium tin titanate phase for which MOR/S <1.0

| | Example Number | | | | | |
|---|---|---|---|---|---|---|
| | 24 | 25 | 26 | 27 | 28 | 29 |
| Wt % Rutile | 0.0 | 2.2 | 0.0 | 2.9 | 3.7 | 3.0 |
| Wt % (Zr, Ti, Sn)O$_4$ | 37.0 | 33.0 | 40.0 | 14 | 27 | 15.0 |
| Pseudobrookite Lattice Parameter a | 9.500 | 9.499 | 9.509 | 9.484 | 9.495 | 9.482 |
| Pseudobrookite Lattice Parameter b | 9.722 | 9.721 | 9.733 | 9.704 | 9.719 | 9.707 |
| Pseudobrookite Lattice Parameter c | 3.605 | 3.603 | 3.605 | 3.602 | 3.603 | 3.596 |
| (Zr, Ti, Sn)O$_4$ Lattice Parameter a | 4.801 | 4.788 | 4.799 | 4.773 | 4.786 | 4.811 |
| (Zr, Ti, Sn)O$_4$ Lattice Parameter b | 5.560 | 5.584 | 5.582 | 5.541 | 5.564 | 5.586 |
| (Zr, Ti, Sn)O$_4$ Lattice Parameter c | 5.076 | 5.085 | 5.089 | 5.052 | 5.070 | 5.096 |
| Approximate Zr per ZrTiO$_4$ from unit cell | 0.88 | 0.80 | 0.85 | 0.78 | 0.81 | 0.89 |
| Approximate Ti per ZrTiO$_4$ from unit cell | 0.75 | 0.72 | 0.69 | 0.92 | 0.80 | 0.63 |
| Approximate Sn per ZrTiO$_4$ from unit cell | 0.37 | 0.48 | 0.47 | 0.30 | 0.39 | 0.48 |

Examples 14B, 17B, and 30

The stability of three aluminum titanate based ceramic bodies in the presence of copper oxide was assessed at 1100° C. for inventive Examples 14 and 17 and also for a ceramic comprised of magnesium-free aluminum titanate+corundum+SrAl$_2$Si$_2$O$_8$. The results are provided in Table 7, which shows the percentages of phases and their unit cell dimensions and volumes before and after mixing the pulverized ceramic with 0.25 wt % copper (II) oxide and heating at 1100° C. for 2 hours. The magnesium-free aluminum titanate+zirconium tin titanate ceramic of Example 14B contained virtually no pseudobrookite-type phase after heat treatment with copper oxide, with the aluminum titanate having decomposed into corundum+rutile. By contrast, Example 17B, in which the pseudobrookite phase comprised approximately 92 mole % Al$_2$TiO$_5$ and 8 mole % MgTi$_2$O$_5$, retained 92% of the initial pseudobrookite present in the ceramic after testing, showing the benefit of magnesium on the stability of the inventive ceramics in the presence of copper oxide. Example 30, which relies on the presence of silicon to stabilize the pseudobrookite phase, retained only 32% of the initial aluminum titanate phase after heat treatment in the presence of copper.

TABLE 7

| | EX 14B | EX 17B | EX 30 |
|---|---|---|---|
| Firing Conditions | | | |
| Hold Temperature (° C.) | 1500 | 1500 | 1410 |
| Hold Time (hours) | 15 | 15 | 16 |
| As-Fired Properties | | | |
| Wt % Pseudobrookite (Psb) | 59.8 | 69.2 | 72.8 |
| Molar Ratio of Al$_2$TiO$_5$/MgTi$_2$O$_5$ in Psb | 100/0 | 92/8 | 100/0 |
| Wt % Corundum | 6.6 | 3.6 | 6.1 |
| Wt % Rutile | 1.0 | 1.0 | 0 |
| Wt % (Zr, Ti, Sn)$_2$O$_4$ Solution | 35.6 | 26.3 | 0 |
| Wt % SrAl$_2$Si$_2$O$_8$ | 0 | 0 | 20.7 |
| Pseudobrookite Lattice Parameter a | 9.457 | 9.497 | — |
| Pseudobrookite Lattice Parameter b | 9.680 | 9.726 | — |
| Pseudobrookite Lattice Parameter c | 3.591 | 3.601 | — |
| Pseudobrookite Cell Volume (Å$^3$) | 328.7 | 332.6 | — |
| (Zr, Ti, Sn)$_2$O$_4$ Lattice Parameter a | 4.813 | 4.820 | — |
| (Zr, Ti, Sn)$_2$O$_4$ Lattice Parameter b | 5.569 | 5.574 | — |
| (Zr, Ti, Sn)$_2$O$_4$ Lattice Parameter c | 5.087 | 5.094 | — |
| (Zr, Ti, Sn)$_2$O$_4$ Cell Volume (Å$^3$) | 136.3 | 136.9 | — |
| After Copper Stability Test | | | |
| Wt % Pseudobrookite | 0.3 | 63.8 | 23.4 |
| Wt % Corundum | 36.0 | 6.1 | 32.3 |
| Wt % Rutile | 31.1 | 4.4 | 22.4 |
| Wt % (Zr, Ti, Sn)$_2$O$_4$ Solution | 32.8 | 25.8 | 0 |
| Wt % SrAl$_2$Si$_2$O$_8$ | 0 | 0 | 21.9 |
| % of Initial Pseudobrookite Remaining | 0.5% | 92% | 32% |
| AT Lattice a (Å) | — | 9.501 | — |
| AT Lattice b (Å) | — | 9.729 | — |
| AT Lattice c (Å) | — | 3.602 | — |
| AT Lattice Vol ((Å$^3$) | — | 332.9 | — |
| ZTS Lattice Parameter a | 4.760 | 4.822 | — |
| ZTS Lattice Parameter b | 5.538 | 5.574 | — |
| ZTS Lattice Parameter c | 5.047 | 5.094 | — |
| ZTS Cell Volume (Å$^3$) | 133.1 | 136.9 | — |

What is claimed is:

1. A ceramic body comprising about 30 wt % to about 90 wt % of at least one phase comprising a pseudobrookite-type crystal structure and about 10 wt % to about 45 wt % of at least one phase comprising zirconium tin titanate.

2. The ceramic body according to claim 1, wherein the at least one pseudo-brookite-type crystal structure comprises magnesium-containing Al$_2$TiO$_5$.

3. The ceramic body according to claim 1, wherein the at least one phase comprising zirconium tin titanate is of the formula (Al)$_{p1}$(Zr)$_{q1}$(Ti)$_{q2}$(Sn)$_{q3}$O$_{4-0.5(p1)}$ wherein
p1+q1+q2+q3=2;
p1 ranges from about 0 to about 0.08;
the value of q1/(q1+q2+q3) ranges from about 0.36 to about 0.60;
the value of q2/(q1+q2+q3) ranges from about 0.23 to about 0.50; and
the value of q3/(q1+q2+q3) ranges from about 0.05 to about 0.33.

4. The ceramic body according to claim 1, wherein the ceramic body comprises less than about 15% of a corundum phase.

5. The ceramic body according to claim 1, wherein the ratio MOR/S is greater than about 1.0, wherein MOR is measured by the four-point method in units of pounds per square inch and wherein S=2140 −18.1(% porosity)−57.2(d$_{50}$)+6.1 (CTE$_{RT-1000° C.}$), wherein d$_{50}$ is in units of micrometers and CTE is in units of 10$^{-7}$° C.$^{-1}$.

6. The ceramic body according to claim 1, having a porosity of at least about 45%.

7. The ceramic body according to claim 1, having a porosity of at least about 50%.

8. The ceramic body according to claim 1, wherein the $CTE_{RT\text{-}1000°\,C.}$ is less than about $30 \times 10^{-7}$ C.$^{-1}$.

9. The ceramic body according to claim 1, wherein the $CTE_{RT\text{-}1000°\,C.}$ is less than about $20 \times 10^{-7}$ C.$^{-1}$.

10. A porous ceramic honeycomb structure comprising a ceramic body comprising about 30 wt % to about 90 wt % of at least one phase comprising a pseudobrookite-type crystal structure and about 10 wt % to about 45 wt % of at least one phase comprising zirconium tin titanate.

11. The porous ceramic honeycomb structure according to claim 10, wherein the porous ceramic honeycomb structure is a wall-flow exhaust gas particulate filter.

12. The porous ceramic honeycomb structure according to claim 10, further comprising at least one catalyst.

13. The porous ceramic honeycomb structure according to claim 12, wherein the at least one catalyst is a copper-containing chabazite zeolite catalyst.

14. The porous ceramic honeycomb structure according to claim 10, wherein the at least one phase comprising zirconium tin titanate is of the formula $(Al)_{p1}(Zr)_{q1}(Ti)_{q2}(Sn)_{q3}O_{4\text{-}0.5(p1)}$ wherein p1+q1+q2+q3=2;

p1 ranges from about 0 to about 0.08;

the value of q1/(q1+q2+q3) ranges from about 0.36 to about 0.60;

the value of q2/(q1+q2+q3) ranges from about 0.23 to about 0.50;

the value of q3/(q1+q2+q3) ranges from about 0.05 to about 0.33.

15. The porous ceramic honeycomb structure according to claim 10, wherein the ceramic body has a $CTE_{RT\text{-}1000°\,C.}$ less than about $30 \times 10^{-7}$ C.$^{-1}$.

16. The porous ceramic honeycomb structure according to claim 10, wherein the ceramic body has a $CTE_{RT\text{-}1000°\,C.}$ less than about $20 \times 10^{-7}$ C.$^{-1}$.

* * * * *